(12) United States Patent
Osumi et al.

(10) Patent No.: US 12,539,095 B2
(45) Date of Patent: Feb. 3, 2026

(54) MEDICAL IMAGE DIAGNOSIS APPARATUS

(71) Applicant: CANON MEDICAL SYSTEMS CORPORATION, Otawara (JP)

(72) Inventors: Ryota Osumi, Nasushiobara (JP); Takatoshi Okumura, Yaita (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 357 days.

(21) Appl. No.: 18/155,272

(22) Filed: Jan. 17, 2023

(65) Prior Publication Data
US 2023/0255601 A1 Aug. 17, 2023

(30) Foreign Application Priority Data

Jan. 31, 2022 (JP) ................................ 2022-013535

(51) Int. Cl.
*A61B 8/08* (2006.01)
*A61B 8/00* (2006.01)
*G06T 5/00* (2024.01)

(52) U.S. Cl.
CPC .............. *A61B 8/08* (2013.01); *A61B 8/4405* (2013.01); *A61B 8/465* (2013.01); *A61B 8/5207* (2013.01); *G06T 5/00* (2013.01)

(58) Field of Classification Search
CPC ...... A61B 8/5207; A61B 8/4405; A61B 8/465
See application file for complete search history.

(56) References Cited

U.S. PATENT DOCUMENTS 9,468,420 B2 10/2016 Wahrenberg
10,284,788 B2 5/2019 Lee et al.
(Continued)

FOREIGN PATENT DOCUMENTS

CN 110730299 B 8/2021
JP 2000-99688 A 4/2000
(Continued)

OTHER PUBLICATIONS

Extended European Search Report issued Jul. 4, 2023, in European Patent Application No. 23154173.1, 10 pages.
(Continued)

*Primary Examiner* — Sean A Frith
(74) *Attorney, Agent, or Firm* — Oblon, McClelland, Maier & Neustadt, L.L.P.

(57) ABSTRACT

The medical image diagnosis apparatus according to an embodiment comprises processing circuitry configured to set a value of an image quality index selected regarding multiple types of the image quality index to display medical image as an anchor, and generate a first thumbnail image based on the anchor; display the first thumbnail image; generate second thumbnail images by increasing or decreasing the image quality index by a preset value from the anchor; display the plurality of second thumbnail images; generate a new first thumbnail image, display the new first thumbnail image, generate a new second thumbnail image, and display the new second thumbnail image; and generate an anchor flow line based on at least a starting point in which the anchor starts a movement and an ending point in which the anchor ends the movement, and set an adjustable range of the value of the image quality index.

15 Claims, 20 Drawing Sheets

(56) References Cited

U.S. PATENT DOCUMENTS

| | | | | |
|---|---|---|---|---|
| 2009/0319897 | A1* | 12/2009 | Kotler | H04N 1/6013 |
| | | | | 715/838 |
| 2010/0086182 | A1* | 4/2010 | Luo | G06T 7/12 |
| | | | | 382/128 |
| 2013/0162646 | A1 | 6/2013 | Lerios et al. | |
| 2013/0286018 | A1 | 10/2013 | Freyhult et al. | |
| 2014/0267867 | A1 | 9/2014 | Lee et al. | |
| 2014/0328526 | A1* | 11/2014 | Wahrenberg | A61B 8/0866 |
| | | | | 382/131 |
| 2016/0042535 | A1 | 2/2016 | Lerios et al. | |
| 2017/0085809 | A1 | 3/2017 | Lee et al. | |
| 2018/0018794 | A1 | 1/2018 | Lerios et al. | |
| 2018/0047188 | A1 | 2/2018 | Park et al. | |
| 2019/0260946 | A1 | 8/2019 | Lee et al. | |
| 2020/0112689 | A1 | 4/2020 | Lee et al. | |
| 2020/0344424 | A1 | 10/2020 | Lee et al. | |
| 2020/0402235 | A1* | 12/2020 | Shigeta | A61B 5/1459 |
| 2021/0248725 | A1 | 8/2021 | Kang et al. | |

FOREIGN PATENT DOCUMENTS

| | | |
|---|---|---|
| JP | 2004-16612 A | 1/2004 |
| JP | 6608126 B2 | 11/2019 |
| JP | 2019-208746 A | 12/2019 |

OTHER PUBLICATIONS

Office Action mailed Jul. 26, 2025, in Chinese Application No. 202310084112.9 filed Jan. 18, 2023 (w/English translation).
Office Action mailed Aug. 1, 2025, in Japanese Application No. 2022-013535 filed Jan. 31, 2022 (w/English translation).

* cited by examiner

MEDICAL IMAGE DIAGNOSIS APPARATUS

CROSS REFERENCE TO RELATED APPLICATION

This application is based upon and claims the benefit of priority from the prior Japanese Patent Application No. 2022-013535, filed on Jan. 31, 2022, the entire contents of which are incorporated herein by reference.

FIELD

Embodiments described in the present specification and drawings generally relate to a medical image diagnosis apparatus.

BACKGROUND

Many types of medical image diagnosis apparatus, such as an ultrasonic diagnosis apparatus, a Magnetic Resonance Imaging (MRI) apparatus, an X-ray Computed Tomography (CT) apparatus, and a Positron Emission Tomography (PET) apparatus are able to adjust an image quality of a medical image based on a user preference.

However, there are many image quality indexes to control the image quality, which makes it difficult for a user of the medical image diagnosis apparatus to adjust a plurality of image quality index values and reach an optimal image quality. For instance, since there are 60 image quality indexes which contributes to an image quality adjustment for a preset image processing, if there are 5 levels of adjustment values for each image quality index to be selected or set from, 5 to a power of 60 combinations of image quality index values may be generated. Likewise, even if an adjustment target is narrowed down to N types of contributory image quality indexes from numerous image quality indexes, the adjustment is still difficult.

For this reason, many medical image diagnosis apparatuses provide several combinations of the image quality indexes as an index based on the user preference. In this case, some have index values adjustable by several levels with the Graphical User Interface (GUI) of a system. However, a degree of freedom of adjusting the image quality becomes quite limited when the combination of image quality indexes becomes indexed as such.

On the other hand, there are medical image diagnosis apparatuses which allow the user to select the image quality index to adjust or adjust the image quality index value while viewing an image. Regarding these medical image diagnosis apparatuses, a plurality of thumbnail images rendered respect to each of a plurality of rendering conditions and a rendering image rendered according to a preset rendering condition are generated.

If the plurality of thumbnail images generated from this method is displayed as a selection button on a touch command screen, it is visually easier to understand than adjusting the image quality index value with numerical inputs or knob operations. However, even in this case, although it becomes easier to adjust via the thumbnail image, still, an adjusting difficulty arising from numerous values to adjust the image quality indexes is not resolved.

DETAILED DESCRIPTION

Hereinafter, respective embodiments of a medical image diagnosis apparatus will be described with reference to the accompanying drawings. Note that, in the description below, same reference signs are given for components substantially identical in terms of configuration and function, and duplicate description will be given only when necessary.

First Embodiment

Figure 1:
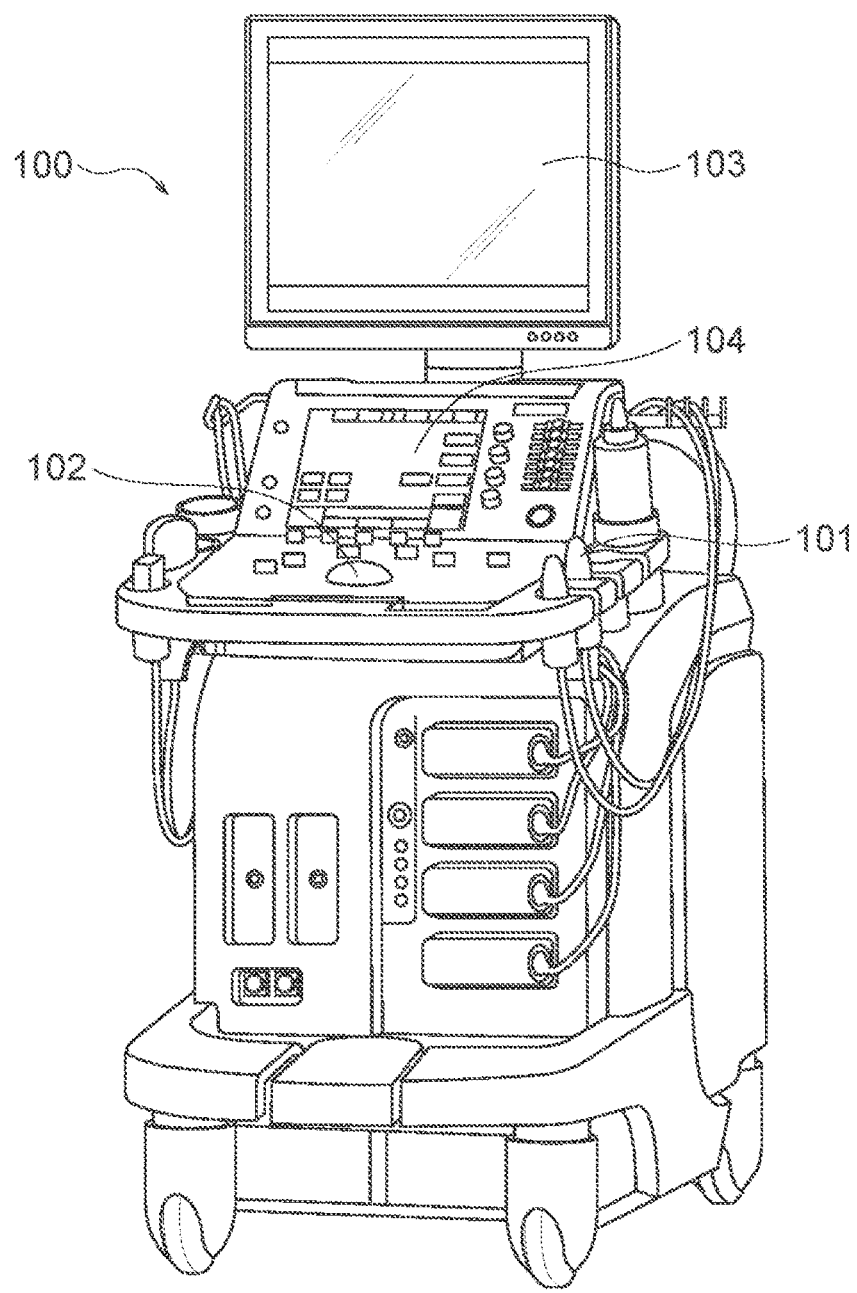
FIG. 1 is a perspective view illustrating an overall configuration of a medical image diagnosis apparatus according to a first embodiment.
Figure 2:
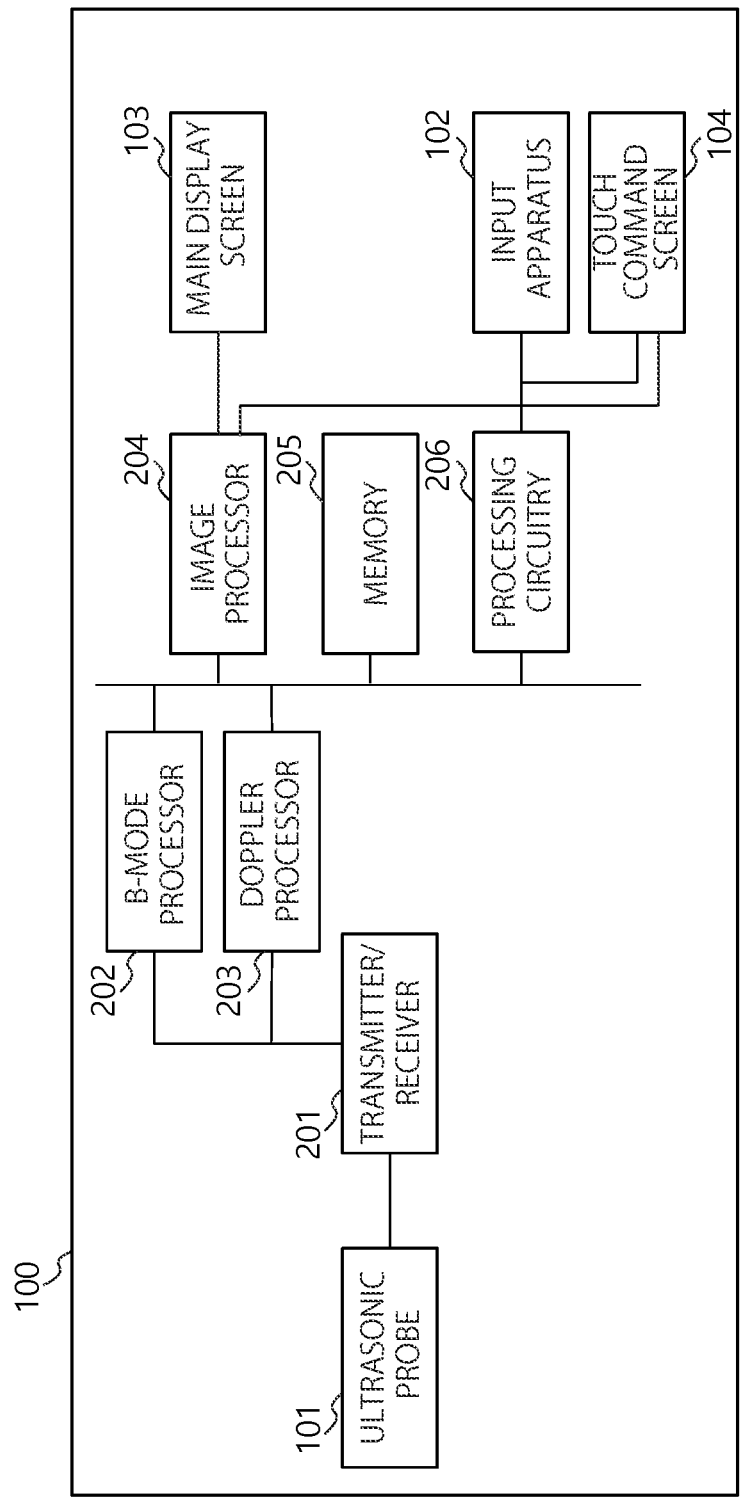
FIG. 2 is a diagram illustrating an exemplary block configuration diagram of the medical image diagnosis apparatus shown in FIG. 1.

FIG. 1 is a perspective view illustrating an exemplary overall configuration of a medical image diagnosis apparatus 100 according to a first embodiment. The medical image diagnosis apparatus 100 shown in FIG. 1, for example, is configured by an ultrasonic diagnosis apparatus. FIG. 2 illustrates an exemplary block configuration diagram of the medical image diagnosis apparatus 100 shown in FIG. 1.

As shown in FIG. 1, the medical image diagnosis apparatus 100 according to the present embodiment is configured by comprising an ultrasonic probe 101, an input apparatus 102, a main display screen 103, and a touch command screen (TCS) 104. Further, as shown in FIG. 2, the medical image diagnosis apparatus 100 is configured by further comprising a transmitter/receiver 201, a B-mode processor 202, a Doppler processor 203, an image processor 204, a memory 205, and a processing circuitry 206 inside.

The ultrasonic probe 101 is a device (probe) which irradiates an ultrasonic signal to a subject and detects the ultrasonic signal reflected from the subject, which is formed of an electrically/mechanically reversible conversion element. This ultrasonic probe 101, for example, is configured by a phased array type probe which equips on its tip a plurality of elements arranged in an array. By this, the ultrasonic probe 101 converts a supplied pulse drive voltage into the ultrasonic signal to transmit it to a desired direction within a scan region of the subject and converts the ultrasonic signal reflected from the subject into an echo signal of a corresponding voltage thereto.

Note that the ultrasonic probe 101 may be an 1D array probe which scans the subject in 2-dimention or a 3-dimentional probe which scans the subject in 3-dimention, i.e., a 4D probe or a 2D array probe. When the 3-dimentional probe is used, a specific tomographic image or a multi planar reconstruction (MPR) image is included on a medical image displayed on the main display screen 103.

The transmitter/receiver 201 has a trigger generation circuitry, a delay circuitry, and a pulsar circuitry etc., and supplies a drive signal to the ultrasonic probe 101. The pulsar circuitry repeatedly generates a rate pulse to form the ultrasonic signal to be transmitted at a preset rate frequency. Likewise, the delay circuitry applies a delay time for every piezoelectric oscillation, necessary to converge the ultrasonic signal generated from the ultrasonic probe 101 into a beam and determine a transmission directivity, to each rate pulse generated by the pulsar circuitry. Further, the trigger generation circuitry applies the drive signal (drive pulse) to the ultrasonic probe 101 at timings based on the rate pulse. That is to say, the delay circuitry arbitrarily adjusts a transmission direction from a piezoelectric oscillator surface by varying the delay time applied to each rate pulse.

Note that the transmitter/receiver 201 comprises a function that may instantaneously change a receiving frequency or a receiving drive voltage etc. to execute a preset scan sequence based on a command from the processing circuitry 206, which will be described below. Especially, a change of a transmitting drive voltage is realized by a transmission circuitry which is able to instantaneously switch that value or a mechanism which electrically switches a plurality of power source units.

Likewise, the transmitter/receiver 201 comprises an amplifier circuitry, A/D converter, an adder etc., and generates a reflected wave data by performing various processing to the ultrasonic signal, which is the reflected wave received by the ultrasonic probe 101. The amplifier circuitry performs a gain correction processing by amplifying, for every channel, the ultrasonic signal, which is the reflected wave. The A/D converter generates digital data by A/D converting the ultrasonic signal, which is the gain corrected reflected wave, and applies the delay time necessary to determine a receiving directivity to the digital data. The adder generates the reflected wave data by performing addition processing of the digital data generated by the A/D converter. A reflective component from a direction corresponding to the receiving directivity of the ultrasonic signal, which is the reflective wave, is enhanced by the addition processing of the adder.

Note that a method of transmitting/receiving by the transmitter/receiver 201 may be a method transmitting/receiving a plane wave, instead of the method converging the ultrasonic signal into a beam as in the description above.

The B-mode processor 202 performs a logarithmic amplification, an envelope detection processing, a logarithmic compression etc., to the reflected wave data from the transmitter/receiver 201 and generates a B-mode information in which each signal intensity of a plurality of sample points is expressed as a change of luminance.

The Doppler processor 203 performs a color Doppler method on the reflected wave data from the transmitter/receiver 201 and computes a blood flow information, i.e., a Doppler information. In the color Doppler method, transmitting/receiving the ultrasonic signal is performed multiple times on a same scan line, suppressing a signal (clutter signal) originating from a stationary tissue or a slow-moving tissue by applying an MTI (Moving Target Indicator) filter to a data array in a same location, and a signal originating from a blood flow is extracted. Then, in the color Doppler method, the Doppler information such as a blood flow velocity, a blood flow dispersion, a blood flow power etc., is estimated from the blood flow signal.

The image processor 204 converts a scanning systems of the B-mode information and the Doppler information into a scanning system suitable for display (scan conversion), and generates an ultrasonic diagnosis image as the medical image. Information indicating a composition, a parallelism, and a display position of each image information, furthermore various information to assist an operation of the medical image diagnosis apparatus 100, which is the ultrasonic diagnosis apparatus, and an attendant information necessary for ultrasonic diagnosis of patient information etc. are generated together with the ultrasonic diagnosis image. Likewise, the image processor 204 generates a thumbnail image for the touch command screen 104, which will be described later, by reducing a size of the medical image after processing.

Note that the image processor 204 comprises an enhancement image processing not shown. The enhancement image processing may perform reduction of an image noise or a speckle, enhancement of an edge of two tissue borders, or coherency enhancement which smooths images around the boundary along a boundary. In other words, the enhancement image processing may independently apply each image quality index of a noise reduction, an edge enhancement, and the coherency enhancement respectively. Adjustment methods of each image quality index will be described later. Likewise, the image processor 204 may also adjust the image quality of the medical image based on image quality indexes other than the noise reduction, the edge enhancement, and the coherency enhancement.

Note that, to simplify the description in the present embodiment, although it is described as a premise that the enhancement image processing is applied to only an image corresponding to an ultrasonic B-mode signal transmitted from the B-mode processor 202, the enhancement image processing may be applied to various images such as the color Doppler, a contrast imaging, an elastography, an attenuation imaging, an M mode, a Doppler flow velocity waveform etc. Likewise, the enhancement image processing may also be applied to an image after rendering, an MPR image, or a 3-dimentional voxel image instead of a tomographic image.

The main display screen 103, in conjunction with the image processor 204, displays the medical image on the screen by converting the image information from the image processor 204 into optical information.

The memory 205 stores each information disclosed in the description of the image processor 204 including the B-mode information or the Doppler information. Likewise, the memory 205 also appropriately stores information related to the trajectory as a result of adjusting each image quality index, a past trajectory, and the adjustable range of the image quality index which will be described later. This memory 205 configures the memory in the present embodiment.

Forms of storing in the memory 205 includes a case of temporarily storing a live information and a case of storing in long-term for evidence of the live information obtained. Likewise, the memory 205 also stores a diagnosis information (for example, a patient ID, a doctor opinion etc.) or various data such as a diagnosis protocol or various body marks, etc.

The processing circuitry 206 is a processor which realizes functions as an information processing apparatus and controls an overall processing of the medical image diagnosis apparatus 100 which is the ultrasonic diagnosis apparatus. Specifically, the processing circuitry 206 controls the processing of the transmitter/receiver 201, the B-mode processor 202, the Doppler processor 203, and the image processor 204, based on various setting requirements input by a user via the input apparatus 102, various control programs, and various data. Furthermore, the processing circuitry 206 also controls an interface function with the input apparatus 102 and the touch command screen 104.

The input apparatus 102 is connected to the processing circuitry 206 and comprises various switches, buttons, a trackball, a mouse, and/or a keyboard etc., to introduce various commands from the user, setting commands for a reason of interest (ROI), various image quality condition setting commands etc., to the medical image diagnosis apparatus 100.

The touch command screen 104 is an input/output device which comprises both a function as a user input device and a function as the output device to output information and image to the user. The touch command screen 104, other than outputting user input information to the processing circuitry 206, obtains the thumbnail image necessary for apparatus input or image such as graphics from the image processor 204. The touch command screen 104 configures the display in the present embodiment.

The touch command screen 104 may be used together with the trackball, the keyboard, a joystick, the mouse, and one or more similar user input devices known in the art. Likewise, the touch command screen 104 may be used together with other screens such as a non-touch command screen. Likewise, there may be the output device and/or more than two user input devices provided. For example, the touch command screen 104 may be provided together with at least one input device such as the trackball, the keyboard, the joystick, or the mouse.

Likewise, by modifying the medical image diagnosis apparatus 100 according to the present embodiment, the main display screen 103 and the touch command screen 104 may be a same device. Furthermore, the main display screen 103, the touch command screen 104, and/or the input apparatus 102 may be separate apparatuses which may be connected to the medical image diagnosis apparatus 100 by a wired or wireless channel.

Likewise, by modifying the medical image diagnosis apparatus 100 according to the present embodiment, the B-mode processor 202, the Doppler processor 203, the image processor 204, the memory 205, and/or the processing circuitry 206 may be provided as one function of a server in a location separate from these elements.

Figure 3:
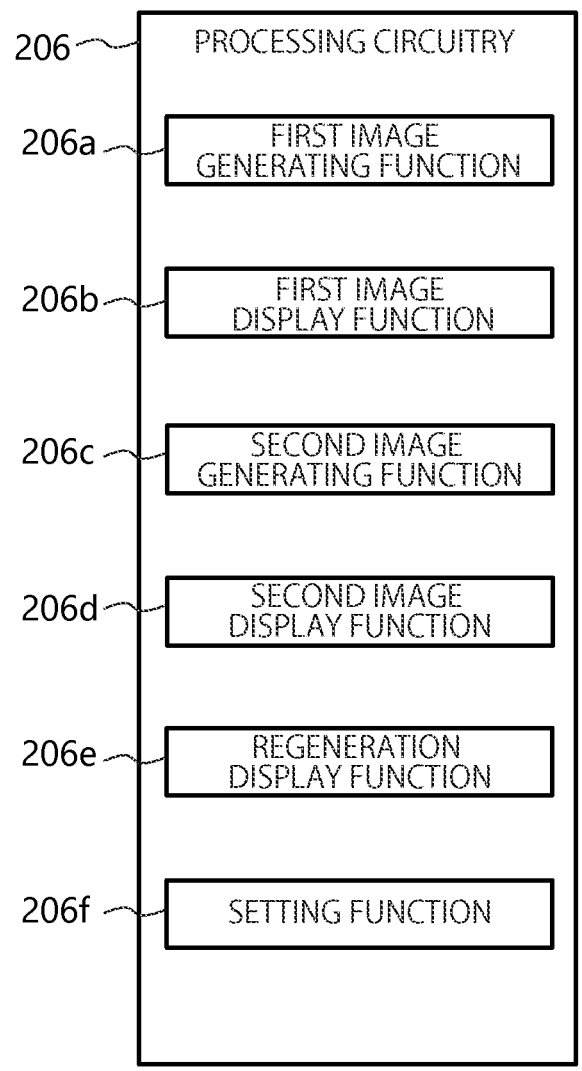
FIG. 3 is a functional block diagram describing a function of a processing circuitry of the medical image diagnosis apparatus shown in FIG. 2.

FIG. 3 is a functional block diagram describing a function of the processing circuitry 206 of the medical image diagnosis apparatus 100 according to the present embodiment. As shown in FIG. 3, in the present embodiment, the processing circuitry 206 comprises a first image generating function 206a, a first image display function 206b, a second image generating function 206c, a second image display function 206d, a regeneration display function 206e, and a setting function 206f.

In the present embodiment, each processing function executed in the first image generating function 206a, the first image display function 206b, the second image generating function 206c, the second image display function 206d, the regeneration display function 206e, and the setting function 206f, is stored in the memory 205 in a form of computer executable program. The processing circuitry 206 realizes functions corresponding to each program by reading the program from the memory and executing it. In other words, the processing circuitry 206 that has read each program will have each function shown in the processing circuitry 206 of FIG. 3. Note that, although it is described in FIG. 3 that the first image generating function 206a, the first image display function 206b, the second image generating function 206c, the second image display function 206d, the regeneration display function 206e, and the setting function 206f are realized in a single processing circuitry 206, these functions may be realized by combining a plurality of independent processors to configure the processing circuitry 206 and executing the program with each processor. Likewise, when the first image generating function 206a, the first image display function 206b, the second image generating function 206c, the second image display function 206d, the regeneration display function 206e, and the setting function 206f realizes each function, the image processor 204, the memory 205, the input apparatus 102, the main display screen 103, and the touch command screen 104 are controlled and used as appropriate.

<Image Quality Adjustment Setting Screen>

Next, the adjustable range setting process regarding the medical image realized by the medical image diagnosis apparatus 100 according to the present embodiment will be described. In the medical image diagnosis apparatus 100 according to the present embodiment, by executing the adjustable range setting process in advance, the adjustable range may be limited when the user thereafter adjusts the image quality of the medical image of the subject.

Figure 4:
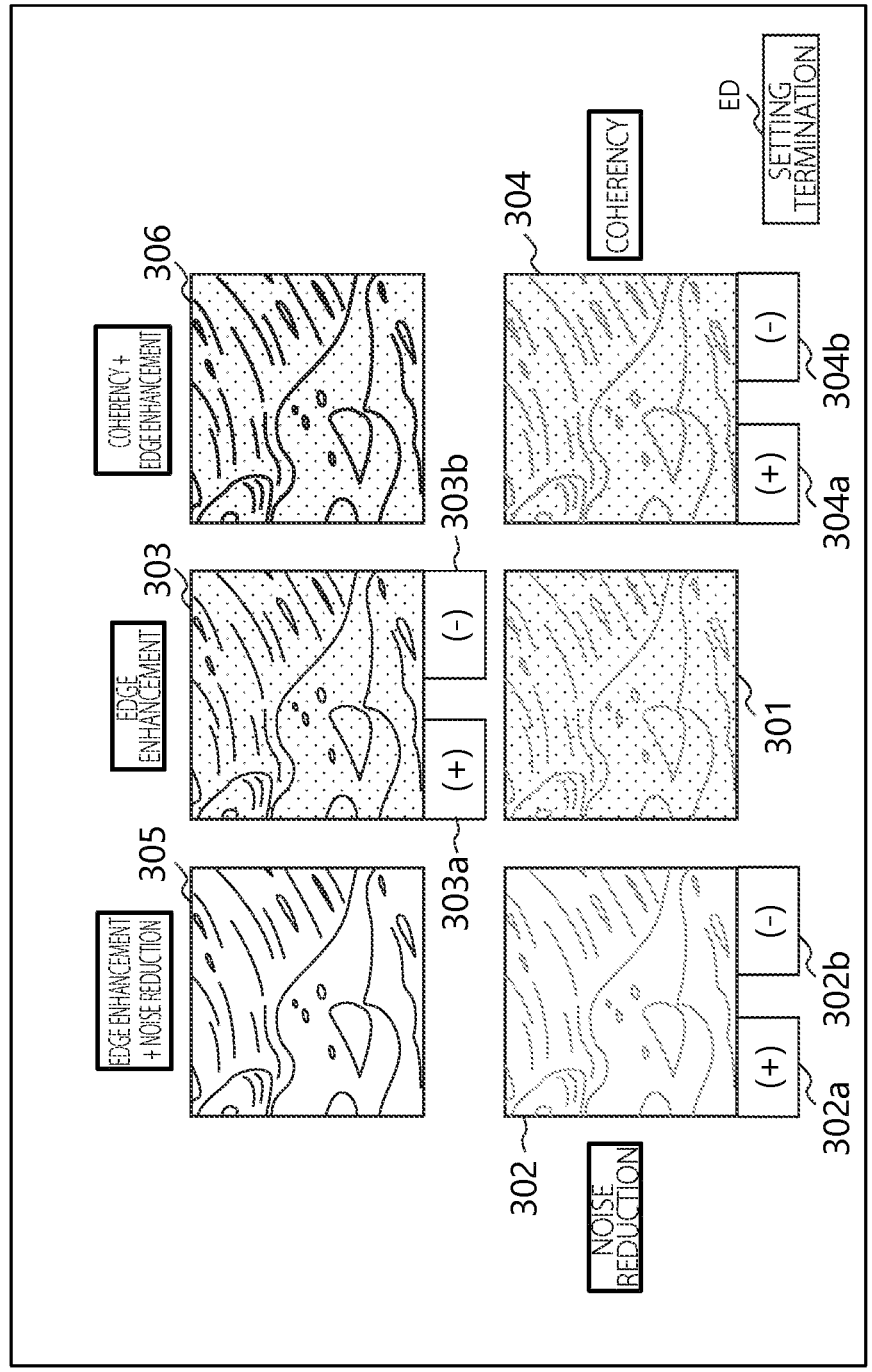
FIG. 4 is a diagram illustrating an example of an image quality adjustment setting screen displayed on a touch command screen of the medical image diagnosis apparatus shown in FIG. 1.

FIG. 4 is a diagram illustrating an example of an image quality adjustment setting screen W10 displayed on the touch command screen 104 of the medical image diagnosis apparatus 100 according to the present embodiment. That is to say, in the medical image diagnosis apparatus 100 according to the present embodiment, although the enhancement image processing is performed at the image processor 204 under a control of the processing circuitry 206, the image quality adjustment setting screen W10 is used as the graphical user interface to adjust the image quality.

In the example of FIG. 4, the user may use the image quality adjustment setting screen W10 to perform the image quality adjustment regarding three types of image quality index: the noise reduction, the edge enhancement, and the coherency enhancement. Note that adjustable image quality indexes for displaying the medical image are not limited to these three types, but various image quality indexes may be adjusted. FIG. 4 illustrates a state in which the user has selected three types of image quality index: the noise reduction, the edge enhancement, and the coherency enhancement, from a plurality of image quality indexes to set the adjustable range.

A first image quality adjustment button 301 to a sixth image quality adjustment button 306 are buttons rendered on the touch command screen 104. In the present embodiment, the first image quality adjustment button 301 to the sixth image quality adjustment button 306 are configured by the thumbnail images of the medical images. In the thumbnail images, output images of a different plurality of image qualities based on a same medical image data are shown.

Among the first image quality adjustment button 301 to the sixth image quality adjustment button 306 displayed on the touch command screen 104, on the first image quality adjustment button 301, the thumbnail image, which is applied a same image processing with that of the medical image displayed at that time on the main display screen 103, is displayed. This thumbnail image becomes the first image quality adjustment button 301. In the present embodiment, a group of each image quality index values to obtain this image quality from the medical image, which becomes a center of a current image quality adjustment, is referred to as an "the anchor."

In the example of FIG. 4, since three types of image quality indexes, the noise reduction, the edge enhancement, and the coherency enhancement are selected as the image quality indexes to adjust, one of each a value of noise reduction, edge enhancement, and coherency enhancement is selected as the anchor. For this reason, the "the anchor" may be comprehended as a point of being determined from these image quality index values. As such, the thumbnail image of the first image quality adjustment button 301 is generated based on the anchor which is image quality index value selected by the user. This thumbnail image of the first image quality adjustment button 301 corresponds to a first thumbnail image according to the present embodiment.

By operating the image quality adjustment setting screen W10, the user may increase or decrease each image quality indexes of the noise reduction, the edge enhancement, and the coherency enhancement by a preset value from the anchor. The buttons for this operation are the second image quality adjustment button 302 to the sixth image quality adjustment button 306. Specifically, the second image quality adjustment button 302 located on a left of the first image quality adjustment button 301 is a button which the user selects to increase or decrease the image quality index value of the noise reduction without changing other image quality index values. Whether to increase or decrease the image quality index value of the noise reduction is switched by the switching buttons 302a, 302b.

For instance, when the user presses the second image quality adjustment button 302 to select after pressing the plus switching button 302a, the image quality index value of the noise reduction regarding the anchor increases one level, and this increased value becomes a next anchor. Vice versa, when the user presses the second image quality adjustment button 302 to select after pressing the minus switching button 302b, the image quality index value of the noise reduction regarding the anchor decreases by just one level, and this decreased value becomes the next anchor.

Also, when the image quality index value of the noise reduction is increased or decreased by just one level, the thumbnail image is displayed on the second image quality adjustment button 302. That is, when the user presses the plus switching button 302a, the thumbnail image of the second image quality adjustment button 302 switches to the thumbnail image in which the image quality index value of the noise reduction level has increased by just one level. On the other hand, when the user presses the minus switching button 302b, the thumbnail image of the second image quality adjustment button 302 switches to an image in which the image quality index value of the noise reduction has decreased by just one level. For this reason, the user may presume a result of the change of image quality index value in advance by watching the thumbnail image displayed on the second image quality adjustment button 302. And, by this, a more appropriate adjustment of the image quality index value may be performed.

Similarly, the third image quality adjustment button 303 located above the first image quality adjustment button 301 is a button which the user selects to increase or decrease the image quality index value of the edge enhancement without changing other image quality index values. Whether to increase or decrease the image quality index value of the edge enhancement is switched by the switching buttons 303a, 303b. The fourth image quality adjustment button 304 located on a right of the first image quality adjustment button 301 is a button which the user selects to increase or decrease the image quality index value of the coherency enhancement without changing other image quality index values. Whether to increase or decrease the image quality index value of the coherency enhancement is switched by the switching buttons 304a, 304b.

The fifth image quality adjustment button 305 is located above the second image quality adjustment button 302 and on the left of the third image quality adjustment button 303. This arrangement means to change both image quality index values of the noise reduction and the edge enhancement. The sixth image quality adjustment button 306 is located on the right of the third image quality adjustment button 303 and above the fourth image quality adjustment button 304. This arrangement means to change both image quality index values of the edge enhancement and the coherency enhancement.

By selecting the fifth image quality adjustment button 305, whether to increase or decrease the image quality index value of the noise reduction is switched by the switching buttons 302a, 302b, and whether to increase or decrease the image quality index value of the edge enhancement is switched by the switching buttons 303a, 303b. That is to say, the increase and decrease of the image quality index values of the noise reduction and the edge enhancement are switched by a combination of the switching buttons 302a, 302b and the switching buttons 303a, 303b.

Similarly, by selecting the sixth image quality adjustment button 306, whether to increase or decrease the image quality index value of the edge enhancement is switched by the switching buttons 303a, 303b, and whether to increase or decrease the image quality index value of the coherency enhancement is switched by the switching buttons 304a, 304b. That is to say, the increase and decrease of the image quality index values of the edge enhancement and the coherency enhancement when selecting the sixth image quality adjustment button 306 are switched by a combination of the switching buttons 303a, 303b and the switching buttons 304a, 304b.

The thumbnails displayed on the third image quality adjustment button 303 to the sixth image quality adjustment button 306 are thumbnail images generated based on each image quality index values, and the user may presume in advance the result of the change of the image quality index values by looking at these thumbnail images. And, by this, more appropriate adjustment of the image quality index value may be performed.

When any of the second image quality adjustment button 302 to the sixth image quality adjustment button 306 is selected by the user, the image quality index value corresponding to a selected image quality adjustment button is set as a new anchor, the thumbnail image based on the image quality index value of the selected image quality adjustment button is displayed on the first image quality adjustment button 301, image processing using the image quality index value corresponding to the selected image quality adjustment button is executed by the image processor 204, and the result is displayed on the main display screen 103 as the medical image. Likewise, thumbnail images of the second image quality adjustment button 302 to the sixth image quality adjustment button 306 are generated based on the image quality index value of the new anchor and displayed to each.

For instance, when the user presses the second image quality adjustment button 302 to select, the image quality index value corresponding to this second image quality adjustment button 302 becomes the image quality index value of the new anchor. As a result, the thumbnail image of the second image quality adjustment button 302 becomes the thumbnail image of the first image quality adjustment button 301. Likewise, the thumbnail images of the second image quality adjustment button 302 to the sixth image quality adjustment button 306 are generated and displayed with the image quality index value of the first image quality adjustment button 301 as the new anchor.

Here, the image quality index value increasing or decreasing by one level means that a value of this increasing or decreasing width is not limited to 1. For instance, the increased or decreased width of the image quality index value may be preset values such as 2, 5, 10. Setting the increasing or decreasing width, for example, may be determined in advance based on the type of image quality index or the imaging site etc. That is to say, in the medical image diagnosis apparatus 100 according to the present embodiment, the image quality index value may be increased or decreased from the anchor by the preset value by the user selecting the second image quality adjustment button 302 to the sixth image quality adjustment button 306.

Note that, as described above, the medical image diagnosis apparatus 100 according to the present embodiment, for example, is configured by the ultrasonic diagnosis apparatus. Considering a real-time characteristic of the ultrasonic diagnosis apparatus, the image displayed on the main display screen 103 does not have to be a still image, but rather may process the B-mode information with the image processor 204 in real-time, transmitted in the preset framerate from the B-mode processor 202, and display on the main display screen 103 as a moving image. That is to say, the medical image obtained in the preset framerate, based on the image quality index value of a current the anchor selected by the user, may be processed in real-time by the image processor 204 and displayed on the main display screen 103 as the moving image. In other words, it is also possible to perform image processing on the medical image obtained by image processor 204 based on the image quality index value corresponding to the thumbnail image of the first image quality adjustment button 301 and display a real-time moving image on the main display screen 103.

On the other hand, the thumbnail images displayed on the first image quality adjustment button 301 to the sixth image quality adjustment button 306 are just samples. For this reason, these thumbnail images may be the still image or the moving image. Likewise, these thumbnail images may be partial images cut based on a ROI set to the main display screen 103.

As described above, when the user presses any of the second image quality adjustment button 302 to the sixth image quality adjustment button 306 to select, the thumbnail image displayed on the selected image quality adjustment button is displayed on the first image quality adjustment button 301, and the image quality index value corresponding to the selected image quality adjustment button becomes the new anchor. Then, the thumbnail images, for which the image quality index value is further increased or decreased with this anchor as the center, are displayed again on the second image quality adjustment button 302 to the sixth image quality adjustment button 306 and wait for the user to further press the image quality adjustment button to select. By this, the user may continuously further adjust the image quality.

Note that a function to restore a changed image quality index value may be assigned the first image quality adjustment button 301. In this case, for instance, when the user determines that an original medical image was better, the anchor may be restored to a previous the anchor, by pressing the first image quality adjustment button 301 to select. That is to say, the user may make the previous the anchor as the new anchor by selecting the first image quality adjustment button 301. By this, the user may easily return the image quality index value which displays the medical image to the previous state. On the other hand, no functions may be assigned to the first image quality adjustment button 301. In this case, even if the user presses the thumbnail image of the image quality adjustment button 301 to select, the image quality of the medical image does not particularly change.

In the image quality adjustment setting screen W10, the user presses the setting termination button ED to select when the user reaches a preferred image quality index value and terminates selecting the image quality index value. By this, A setting of the adjustable range regarding the image quality index of the medical image terminates.

Figure 5:
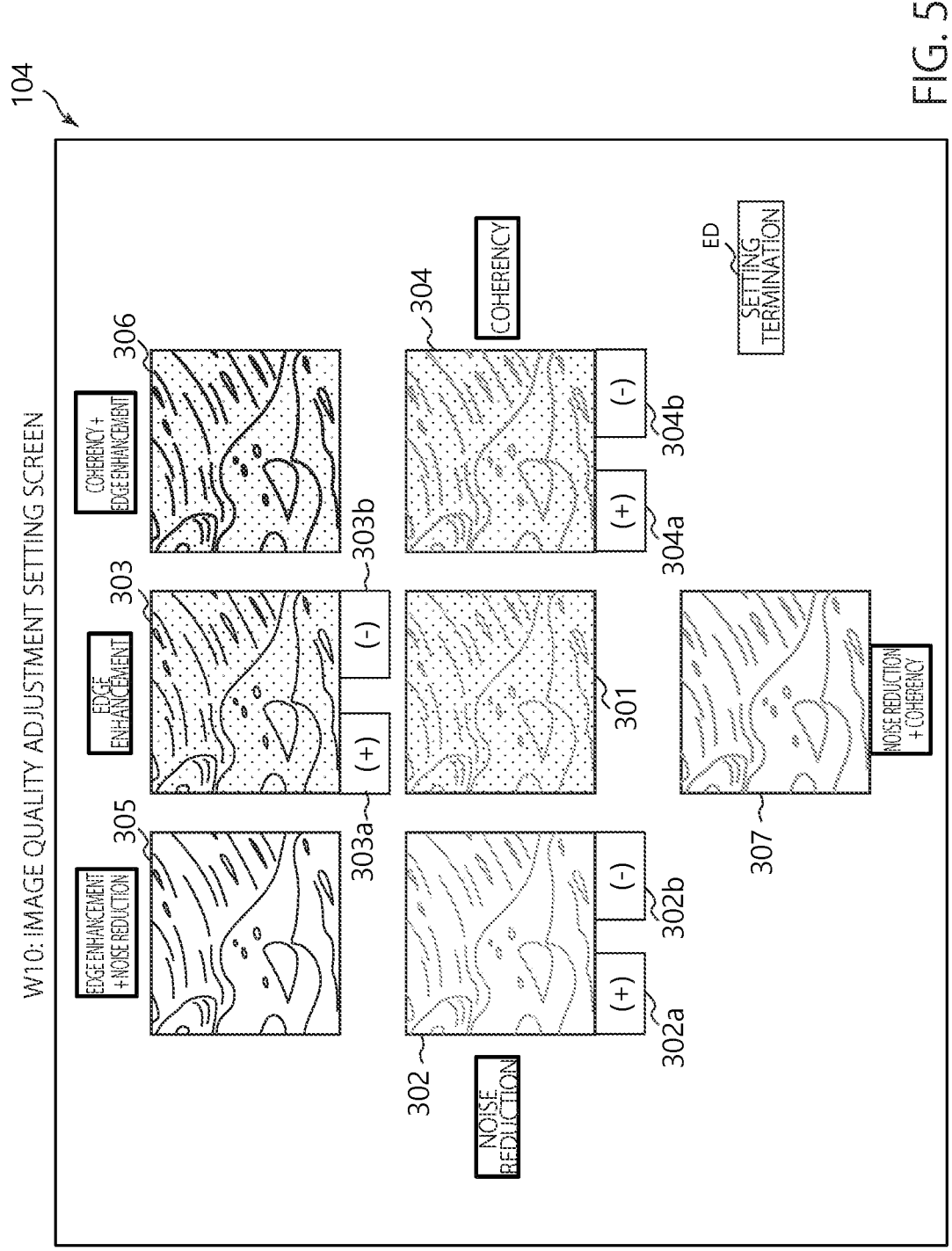
FIG. 5 is a diagram illustrating a different example of the image quality adjustment setting screen displayed on the touch command screen of the medical image diagnosis apparatus shown in FIG. 1.

FIG. 5 is a diagram illustrating a different example of the image quality adjustment setting screen W10 displayed on the touch command screen 104 of the medical image diagnosis apparatus 100 according to the present embodiment. Regarding the image quality adjustment setting screen W10 in FIG. 4 described above, two combinations simultaneously changing two image quality indexes were provided: (1) the image quality index values of the edge enhancement and the noise reduction and (2) the image quality index values of the coherency enhancement and the edge enhancement. However, on the image quality adjustment setting screen W10 in FIG. 4, there was no combination simultaneously changing the two values of (3) the image quality index values of the noise reduction and the coherency enhancement. For this reason, a seventh image quality adjustment button 307 which simultaneously changes (3) the image quality index values of the noise reduction and the coherency enhancement, is provided on the image quality adjustment setting screen W10 shown in FIG. 5.

Similar to that of the image quality adjustment setting screen W10 in FIG. 4 described above, when the seventh image quality adjustment button 307 of the image quality adjustment setting screen W10 in FIG. 5 is selected, whether to increase or decrease the image quality index value of the noise reduction is switched by the switching buttons 302a, 302b. Similarly, whether to increase or decrease the image quality index value of the coherency enhancement is switched by the switching buttons 304a, 304b. For instance, when the user presses the plus switching button 302a of the noise reduction to select and presses the seventh image quality adjustment button in a state pressing the minus switching button 304b of the coherency enhancement to select, the new anchor becomes a value in which the image quality index value of the noise reduction increased by just one level and the image quality index value of the coherency enhancement decreased by just one level. As such, adjusting the image quality of the medical images by the user may become smoother by displaying on the image quality adjustment setting screen W10, the image quality adjustment buttons which may simultaneously change every two combinations regarding the types of image quality indexes adjusted by the user.

Figure 6:
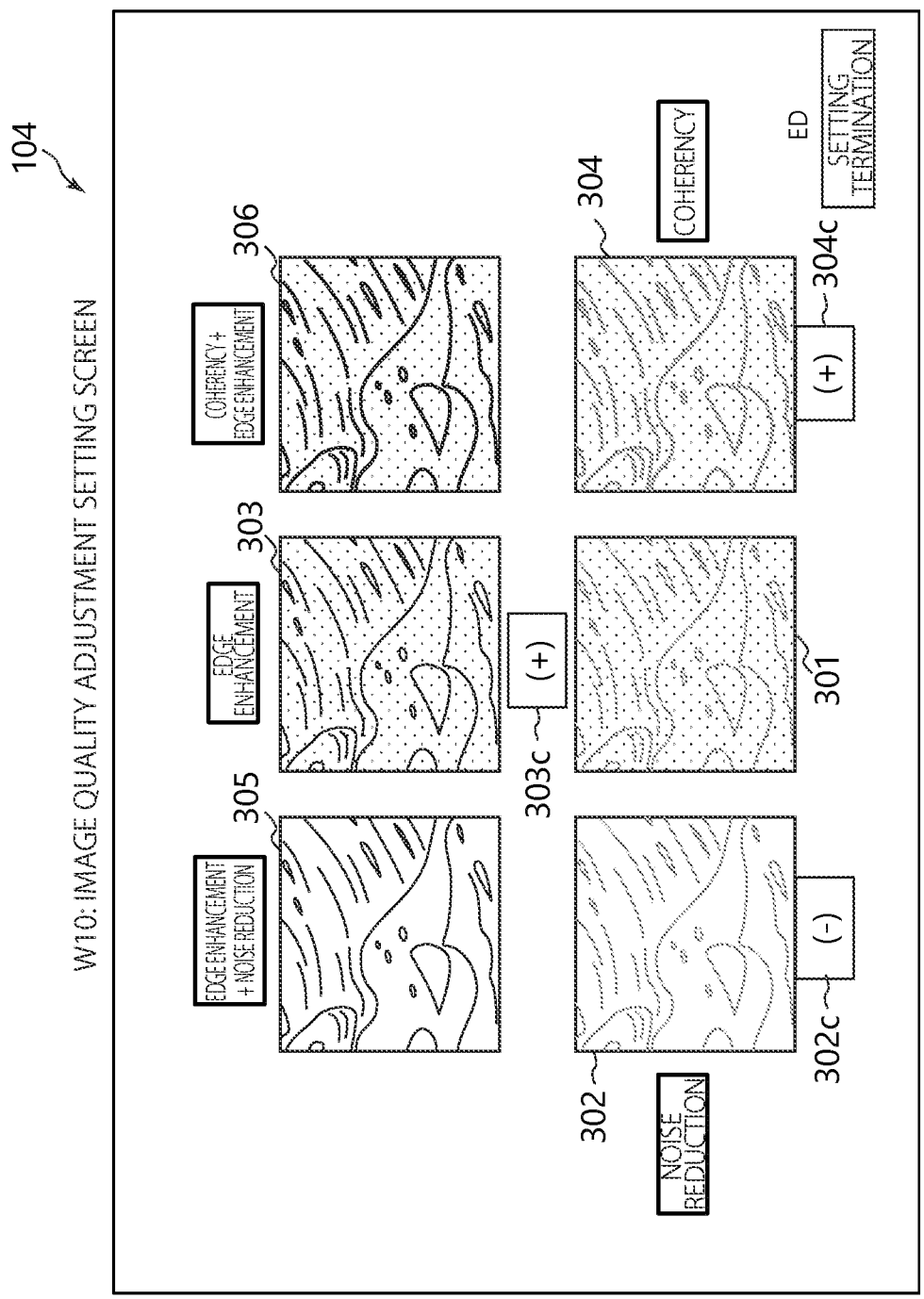
FIG. 6 is a diagram illustrating a further different example of the image quality adjustment setting screen displayed on the touch command screen of the medical image diagnosis apparatus shown in FIG. 1.

Note that, on the image quality adjustment setting screen W10 shown in FIGS. 4 and 5, although the switching buttons which switch increasing or decreasing the image quality index value show two, the plus and minus, for each image quality indexes, this switching button may be one for each image quality indexes. For instance, taking FIG. 4 as an example, one switching button 302c is displayed for the image quality index of the noise reduction, the switching button 303c is displayed for the image quality index of the edge enhancement, and the switching button 304c is displayed for the coherency enhancement, as shown in FIG. 6. Each of the switching buttons 302c to the 304c alternately switches between plus and minus every time when the user selects. For instance, the switching button 302c in FIG. 6 displays minus, but switches to plus when the user presses the switching button 302c to select.

In a case where plus is displayed on the switching button 302c, the thumbnail image displayed on the second image quality adjustment button 302 is the thumbnail image for which the image quality index value of the noise reduction is increased by just one level from the anchor. On the other hand, in a case where minus is displayed on the switching button 302c, the thumbnail image displayed on the second image quality adjustment button 302 is the thumbnail image for which the image quality index value of the noise reduction is decreased by just one level from the anchor. As such, by having one switching button which switches increasing or decreasing the image quality index value, whether to increase or decrease the image quality index value is alternatively switched.

Note that the thumbnail images displayed on the second image quality adjustment button 302 to the sixth image quality adjustment button 306 in FIGS. 4 and 6 correspond to the second thumbnail image according to the present embodiment. Alternatively, the thumbnail images displayed in the second image quality adjustment button 302 to the seventh image quality adjustment button 307 in FIG. 5 correspond to the second thumbnail image according to the present embodiment.

<Adjustable Range Settings>

In the medical image diagnosis apparatus 100 according to the present embodiment, it is possible to not only adjust the image quality by the user operating the first image quality adjustment button 301 to the sixth image quality adjustment button 306 on the touch command screen 104 and changing a plurality of image quality index value, but also generate an anchor flow line by the user operation based on at least a starting point in which the anchor starts a movement and an ending point in which the anchor ends a movement, and set the adjustable range of the image quality index value by user operation based on the anchor flow line. That is to say, the anchor flow line is defined by at least a trajectory of the anchor selected by the user comprising the starting point and the ending point of a movement of the anchor. Then, in the medical image diagnosis apparatus 100 according to the present embodiment, once the adjustable range of the image quality index value is set, when adjusting the image quality of the medical image by the user thereafter, it is possible to limit the range of image quality index value which the user may select based on the set adjustable range.

Figure 7:
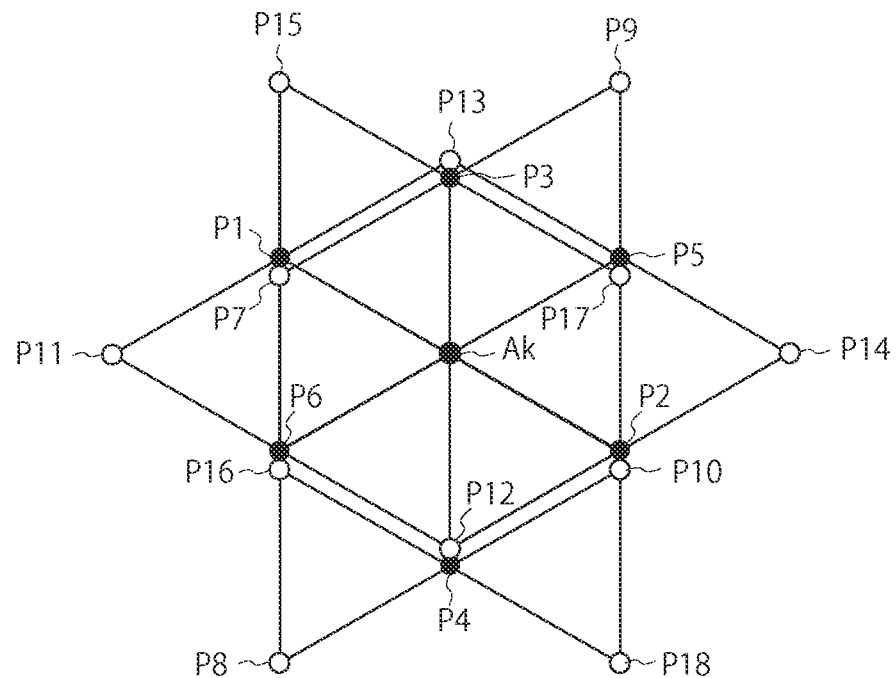
FIG. 7 is a diagram visualizing the adjustable range of an anchor and each image quality index value using 3-dimentional axis, when a user adjusts an image quality on the image quality adjustment setting screen displayed on the touch command screen.

FIG. 7 is a diagram visualizing a changed range of the anchor and each image quality index value using 3-dimentional axis, when the user adjusts the image quality on the image quality adjustment setting screen W10 described in FIGS. 4 and 6. The anchor Ak is located on an origin, an X-axis indicates a value of coherency enhancement C, a Y-axis indicates a value of noise reduction N, and a Z-axis indicates a value of edge enhancement E.

As shown in FIG. 7, when the second image quality adjustment button 302 is selected in a state in which plus is selected, the anchor Ak moves by just one level to a location P1 of a plus direction along the Y-axis which indicate the value of noise reduction N. Vice versa, when the second image quality adjustment button 302 is selected in a state in which minus is selected, the anchor Ak moves by just one level to a location P2 of a minus direction along the Y-axis indicating the value of noise reduction N. An amount of increase or decrease of the value of noise reduction N along the Y-axis at this time is one level, which is defined as ΔN.

Similarly, by the user operation of the third image quality adjustment button 303, the anchor Ak moves to a location P3 increased by just one level and to a location P4 decreased by just one level along the Z-axis indicating the value of edge enhancement E. This amount of increase or decrease is defined as ΔE. Likewise, by the user operation of the fourth image quality adjustment button 304, the anchor Ak moves to a location P5 increased by just one level and to a location decreased by just one level along the X axis indicating the value of coherency enhancement C. This amount of increase or decrease is defined as ΔC.

Furthermore, as described above, by the user operation of the image quality adjustment buttons which combine two of multiple types of image quality indexes, it is possible to simultaneously increase or decrease two image quality index values. In this case, the anchor Ak moves to one of the locations P7 to the P18 in response to combinations of two image quality index values which are simultaneously increased or decreased.

As such, the adjustable range of the image quality index value may be comprehended as a pseudo-3-dimentional space centered on the anchor Ak. For this reason, FIG. 7 is a diagram which expresses a possible range of the increase or decrease of the image quality index value as the pseudo-3-dimentional space with the one operation of the image quality adjustment button on the image quality adjustment setting screen W10.

Figure 8:
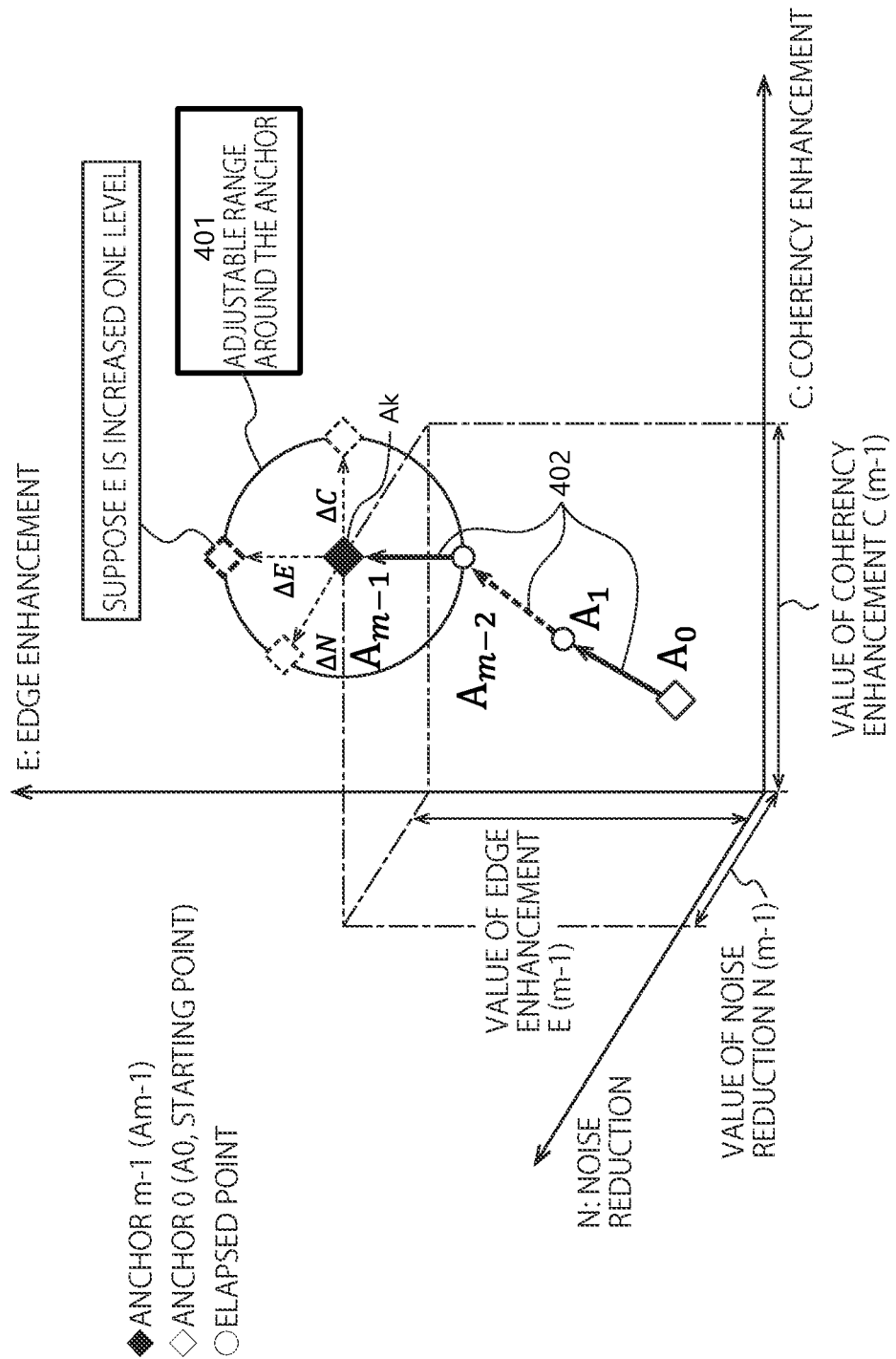
FIG. 8 is a diagram expressing the adjustable range in 3-dimentional space when the anchor is at point $A_{m-1}$.

FIG. 8 is a diagram expressing the adjustable range in 3-dimentional space when the anchor Ak is at point $A_{m-1}$. In FIG. 8, the starting point in which the anchor Ak starts the movement is $A_0$, and a state in which the anchor Ak has moved to point $A_{m-1}$ by the m−1$^{th}$ operation of the image quality adjustment button is shown. A noise reduction component at this time, i.e., the value of noise reduction N is N (m−1), an edge reduction component, i.e., the value of edge enhancement E is E (m−1), and a coherency enhancement component, i.e., the value of coherency enhancement C is C (m−1).

Then, the adjustable range 401 of the image quality index value around the anchor Ak is expressed in 3-dimentional space. As described above, the adjustable range 401 has a spread of $\Delta C$ in an X-axis direction (C-direction), $\Delta N$ in a Y-axis direction (N-direction), and $\Delta E$ in a Z-axis direction (E-direction). The trajectory of the anchor Ak from point $A_0$ to point $A_{m-1}$ at this time is indicated by a plurality of arrows 402.

Figure 9:
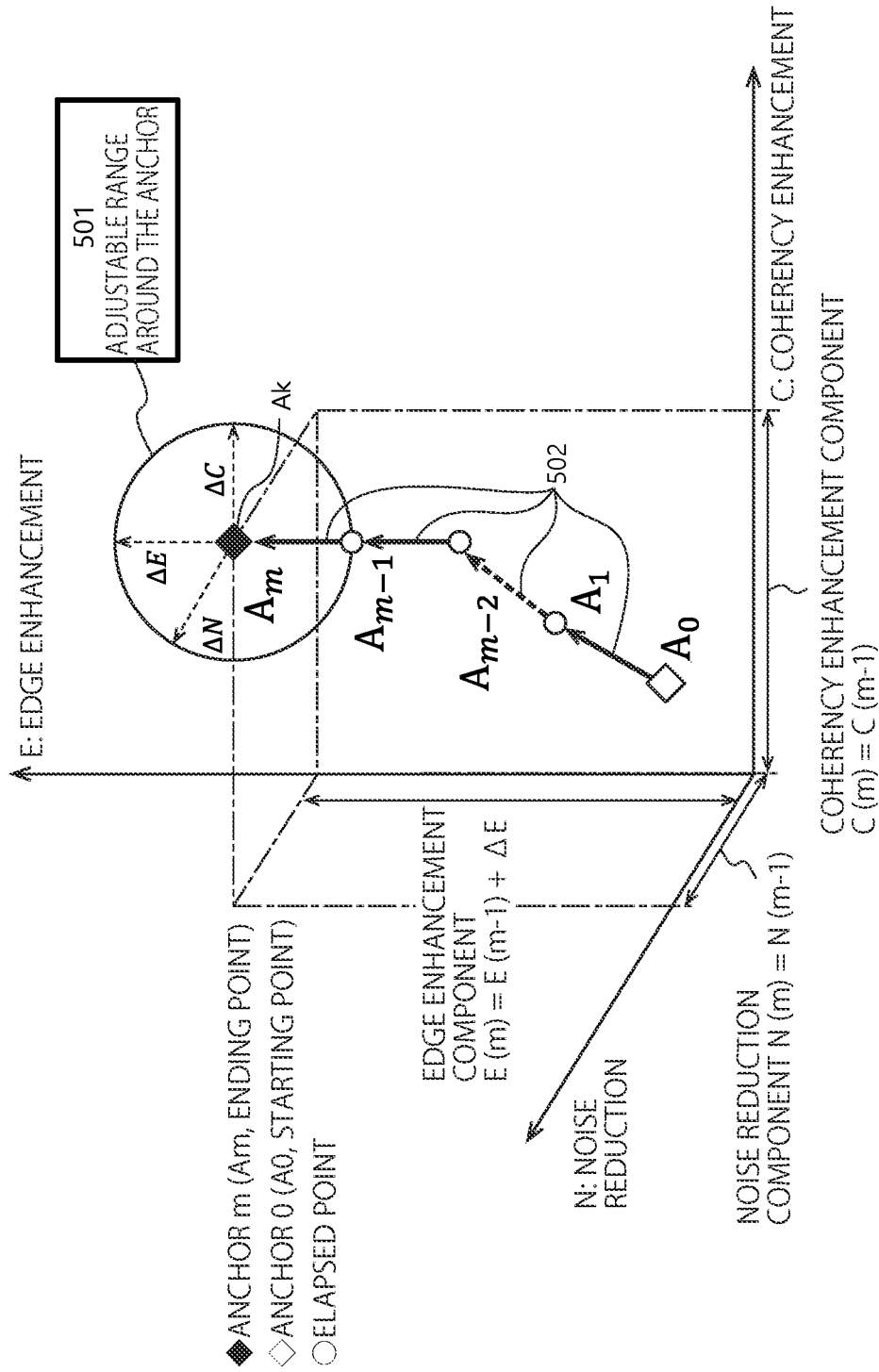
FIG. 9 is a diagram expressing the adjustable range in 3-dimentional space when the anchor moves to point $A_{m-1}$.

Here, suppose that the user adjusts the image quality index to increase the value of edge enhancement E by one level. By this, the value of edge enhancement increases by $\Delta E$, and the anchor Ak moves to the positive direction of the Z-axis. The 3-dimentional space after this movement is shown in FIG. 9. Among the image quality indexes at this time, the value of noise reduction N, the value of edge enhancement E, and the value of coherency enhancement C may each be expressed as follows.

$N(m)=N(m-1)$ $E(m)=E(m-1)+\Delta E$ $C(m)=C(m-1)$

The adjustable range 501 around point $A_m$ for which the anchor Ak is located may be expressed in 3-dimentional space as shown in FIG. 9. Likewise, the trajectory of the anchor Ak from point $A_0$ to point $A_m$ is indicated by the plurality of arrows 502.

Here, suppose that the user terminates selecting the image quality index value since the medical image with a personally preferable image quality was obtained at a time when the anchor Ak moved to point $A_m$. That is to say, suppose that the user presses a setting termination button ED of the image quality adjustment setting screen W10 to select at the time when the anchor Ak shown in FIG. 9 moved to point $A_m$.

Figure 10:
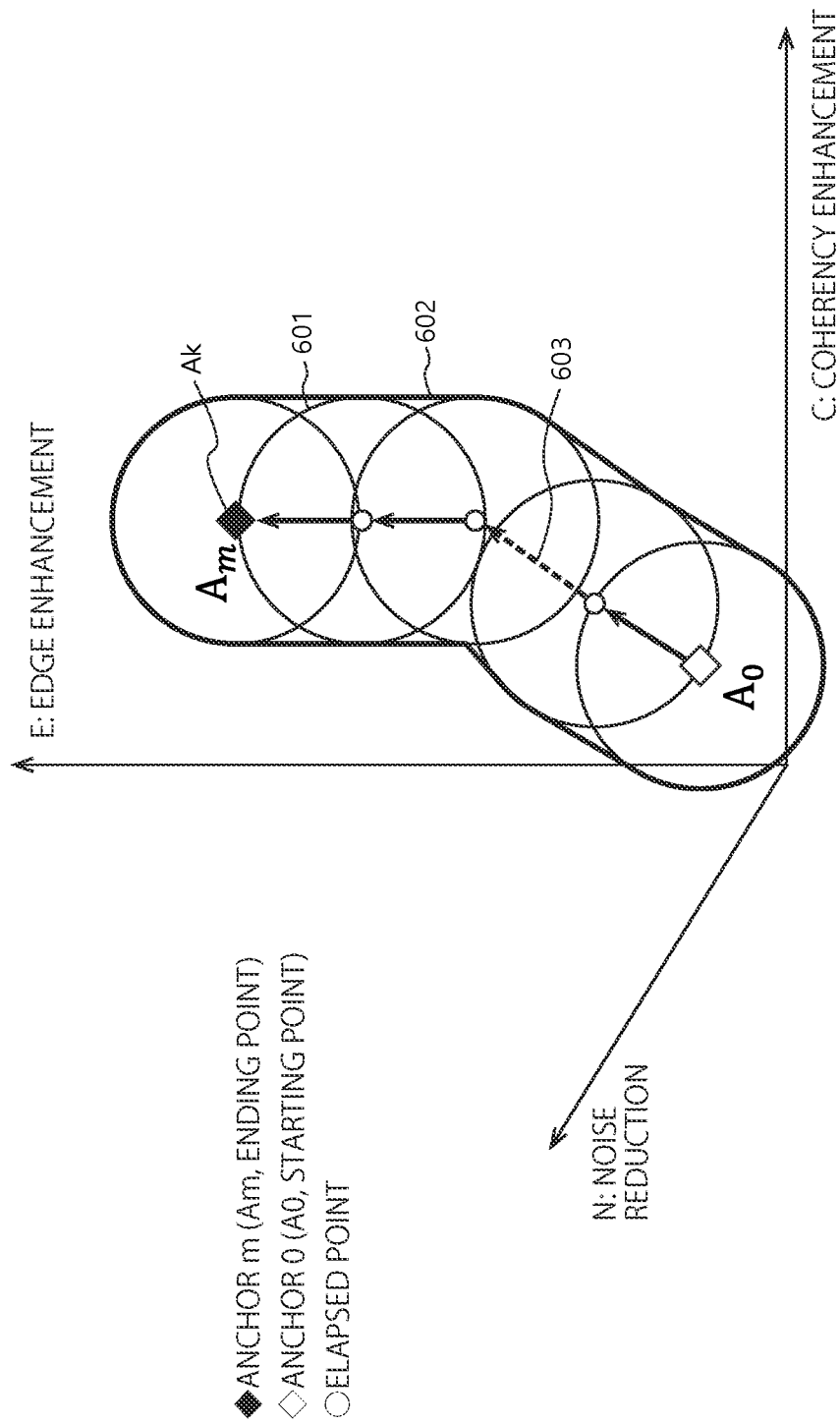
FIG. 10 is a diagram expressing, in 3-dimentional space, a trajectory of the anchor when the anchor moves from a starting point to an ending point, and the adjustable range of the image quality index value when the trajectory of this anchor becomes an anchor flow line.

FIG. 10 is a diagram expressing in 3-dimentional space the trajectory of the anchor Ak when the anchor Ak moved from point $A_0$ to point $A_m$ and the adjustable range 601 until then. That is to say, during the user operation of setting the adjustable range of the image quality index value, the locations in which the anchor Ak starts and ends the move become points $A_0$ and $A_m$. In the example of FIG. 10, a space 602 comprising each of the adjustable range 601 centered on each point from point $A_0$ to point $A_m$, becomes an overall adjustable range.

In other words, an anchor flow line 603 is generated based on the trajectory of the anchor from point $A_0$ to point $A_m$ which are the starting point and the ending point in which the anchor Ak starts and ends the movement, and the adjustable range of the image quality index value by the user is set based on this anchor flow line 603. In this case, the adjustable range of the image quality index value becomes the space 602 within a preset range from the anchor flow line 603 which connects the points of the anchor Ak, as well as the points of the anchor Ak.

Figure 11:
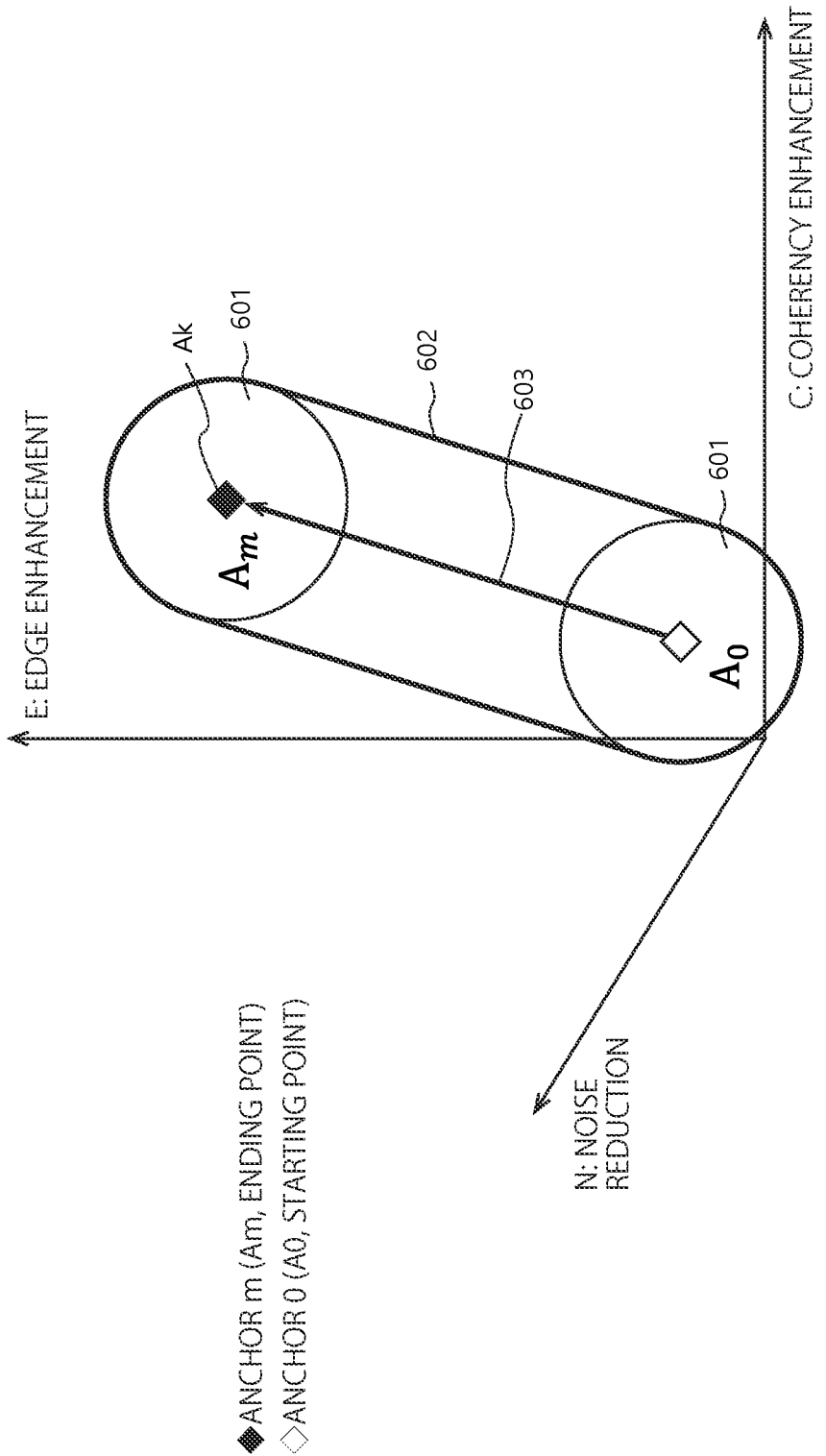
FIG. 11 is a diagram which expressing the adjustable range of the image quality index value in 3-dimentional space when the starting point and the ending point of an anchor movement are connected by a straight line, and this straight line becomes the anchor flow line.

FIG. 11 is a diagram expressing the adjustable range of the image quality index value in the 3-dimentional space, in a case where a straight line connects from point $A_0$ to point $A_m$ which are the starting point and the ending point in which the anchor Ak starts and ends the movement, and where the straight line becomes the anchor flow line 603. In the example of FIG. 11, the anchor flow line 603 is generated based on the straight line connecting from point $A_0$ to point $A_m$ which are the starting point and the ending point in which the anchor Ak starts and ends the movement. Then, the anchor flow line 603, i.e., the space 602 within a preset range from the straight line connecting from point $A_0$ to point $A_m$ which are the starting point and the ending point in which the anchor starts and ends the movement, is set as the adjustable range of the image quality index value.

As may be known from FIGS. 10 and 11, with point $A_0$ in which the anchor Ak starts the movement as the starting point, and with point $A_m$ in a different location from the starting point, in which it ends the movement as the ending point, various anchor flow lines may be generated based on at least the starting point and the ending point of the movement. That is to say, the anchor flow line based on the starting point and the ending point of the movement of the anchor Ak may be generated in an arbitrary manner.

Figure 12:
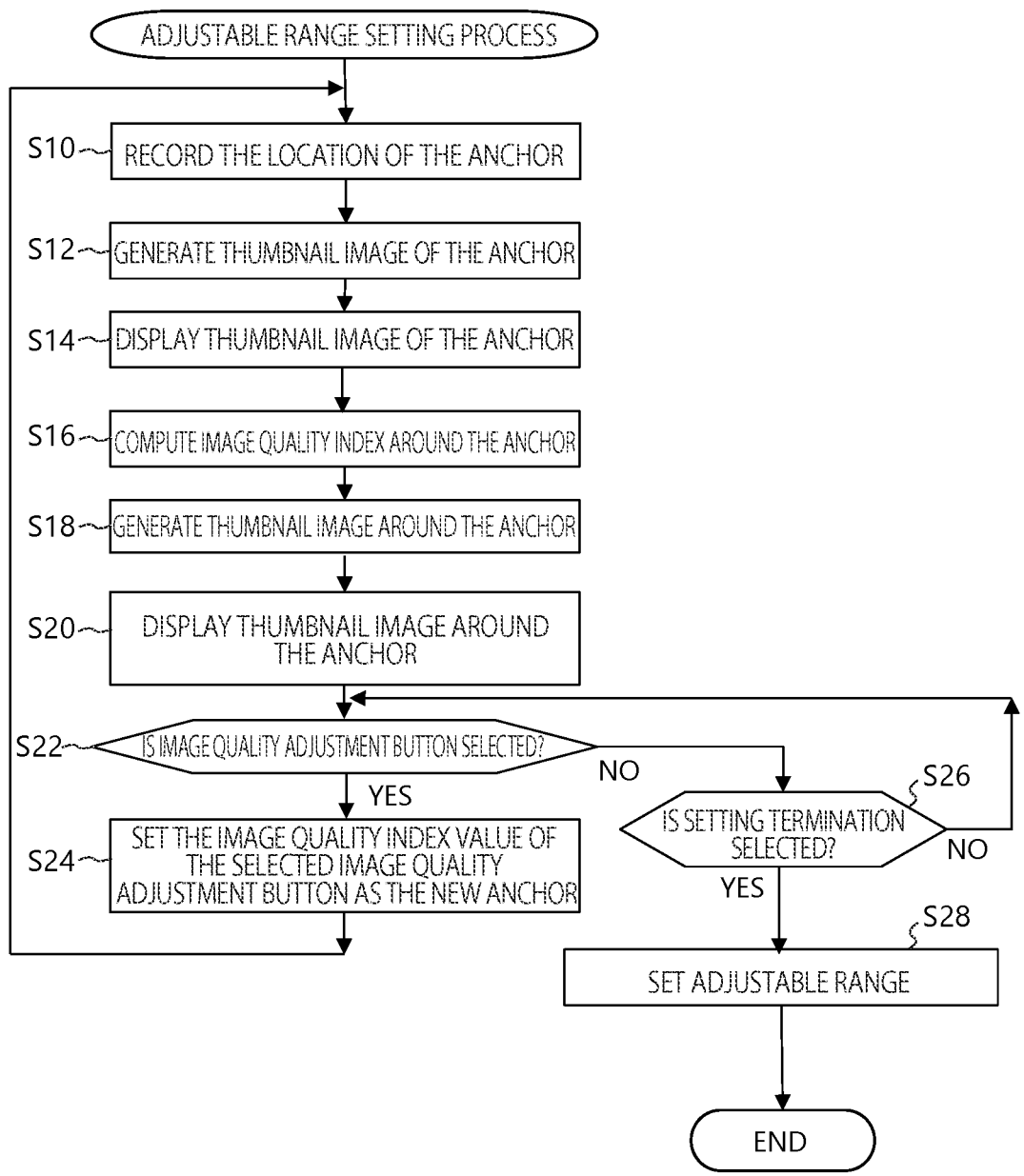
FIG. 12 is a flowchart describing a content of the adjustable range setting process executed by the medical image diagnosis apparatus shown in FIG. 1.

FIG. 12 is a flowchart describing a content of the adjustable range setting process executed by the medical image diagnosis apparatus 100 according to the present embodiment. That is to say, the process to set the adjustable range of the image quality index value described in FIGS. 8 through 11 is realized by the medical image diagnosis apparatus 100 executing the adjustable range setting process shown in FIG. 12.

In the present embodiment, the adjustable range setting process shown in FIG. 12 is a process by the user operating the input apparatus 102 or the touch command screen 104, executed by commanding a start of the adjustable range setting process to the medical image diagnosis apparatus 100. That is to say, this is a process executed when the user wants to make a setting which limits the adjustable range of the image quality index value of the medical images generated thereafter.

As shown in FIG. 12, when the adjustable range setting process is executed, the medical image diagnosis apparatus 100 first records the location of the anchor Ak (Step S10). Specifically, the setting function 206f in the processing circuitry 206 of the medical image diagnosis apparatus 100 records the location of the anchor Ak at that time in the memory 205 as a coordinate. Initially when the adjustable range setting process is executed, the value of noise reduction, the value of edge enhancement, and the value of coherency enhancement are each set as initial values N(0), E(0), and C(0). These are the initial values of the image quality index value.

Next, as shown in FIG. 12, the medical image diagnosis apparatus 100 generates the thumbnail image of the anchor Ak based on the medical image (Step S12). Specifically, the first image generating function 206a in the processing circuitry 206 of the medical image diagnosis apparatus 100 controls the image processor 204 and generates the thumbnail image based on the image quality index value of the anchor Ak. This thumbnail image of the anchor Ak is generated with the image quality index value same to that of the medical image displayed on the main display screen 103. Note that, when generating the thumbnail image of the anchor Ak, the processing circuitry 206 generates the thumbnail image based on the image quality index value of the anchor Ak, in conjunction with the image processor 204 by controlling the image processor 204. As described above, the thumbnail image of this anchor Ak corresponds to the first thumbnail image according to the present embodiment.

Next, as shown in FIG. 12, the medical image diagnosis apparatus 100 displays the thumbnail image of the anchor Ak generated in step S12 as the first image quality adjustment button 301 on the image quality adjustment setting screen W10 of the touch command screen 104 (Step S14). Specifically, a first image display function 206b in the processing circuitry 206 of the medical image diagnosis apparatus 100 displays the thumbnail image of the anchor Ak as the first image quality adjustment button 301 on a center part of the image quality adjustment setting screen W10 of the touch command screen 104.

Next as shown in FIG. 12, the medical image diagnosis apparatus 100 computes the image quality index value around the anchor Ak (Step S16). Specifically, the second image generating function 206c in the processing circuitry 206 of the medical image diagnosis apparatus 100 increases or decreases the image quality index value by the preset value from the anchor Ak and computes the plurality of image quality index values around the anchor Ak. As described above, there is a need to compute five pairs of image quality index values on the image quality adjustment setting screen W10 exemplified in FIG. 4, and there is a need to compute six pairs of image quality index values on the image quality adjustment setting screen W10 exemplified in FIG. 5.

Next, as shown in FIG. 12, the medical image diagnosis apparatus 100 generates the thumbnail image around the anchor Ak based on the image quality index value computed at Step S16 (Step S18). Specifically, the second image generating function 206c in the processing circuitry 206 of the medical image diagnosis apparatus 100 controls the image processor 204 and generates the thumbnail image around the anchor Ak. As described above, there is a need to generate five thumbnail images on the image quality adjustment setting screen W10 exemplified in FIG. 4, and there is a need to generate six thumbnail images on the image quality adjustment setting screen W10 exemplified in FIG. 5. Note that, when generating the thumbnail images around the anchor Ak, the processing circuitry 206 generates these thumbnail images, in conjunction with the image processor 204 by controlling the image processor 204. As described above, the thumbnail images around this anchor Ak corresponds to the second thumbnail image according to the present embodiment.

Next, as shown in FIG. 12, the medical image diagnosis apparatus 100 displays the thumbnail images around the anchor Ak generated at Step S18 as the image quality adjustment buttons for the user to change the image quality index value on the image quality adjustment setting screen W10 of the touch command screen 104 (Step S20). Specifically, the second image display function 206d in the processing circuitry 206 of the medical image diagnosis apparatus 100 displays the thumbnail images around the anchor Ak on the image quality adjustment setting screen W10 of the touch command screen 104.

In the case of the image quality adjustment setting screen W10 exemplified in FIG. 4, the medical image diagnosis apparatus 100 displays five thumbnail images on the touch command screen 104 as the second image quality adjustment button 302 to the sixth image quality adjustment button 306. Likewise, in the case of the image quality adjustment setting screen W10 exemplified in FIG. 5, the medical image diagnosis apparatus 100 displays six thumbnail images on the touch command screen 104 as the second image quality adjustment button 302 to the seventh image quality adjustment button 307. In either case, a plurality of thumbnail images are displayed as image quality adjustment buttons around the thumbnail images of the anchor Ak displayed at Step S14. By arranging the thumbnail image of the anchor Ak on the center part of the image quality adjustment setting screen W10 and arranging the thumbnail images with changed image quality index value around that, the user may instinctively grasp how to change the image quality index value among the current image quality index value to get closer to a target image quality.

Likewise, when the medical image diagnosis apparatus 100 displays the thumbnail images around the anchor Ak, a function of image quality selection buttons corresponding to that image quality index values of the thumbnail images are assigned to each thumbnail image. That is to say, the image quality index values of each thumbnail images around the anchor Ak was computed at Step S16, but button functions which change the anchor Ak to this image quality index value, are assigned to each thumbnail image.

Next, as shown in FIG. 12, the medical image diagnosis apparatus 100 determines whether the image quality adjustment button displayed on the image quality adjustment setting screen W10 is selected by the user or not (Step S22). Specifically, the regeneration display function 206e in the processing circuitry 206 of the medical image diagnosis apparatus 100 determines whether the user has selected the image quality adjustment button or not.

Then, when determining that the user has pressed any image quality adjustment button to select (Step S22: Yes), the image quality index value corresponding to the image quality adjustment button selected by the user is set as the new anchor (Step S24). Specifically, the regeneration display function 206e in the processing circuitry 206 of the medical image diagnosis apparatus 100 sets the image quality index value corresponding to the image quality adjustment button selected by the user among the plurality of image quality adjustment buttons as the new anchor.

At this time, supposing that a button operation was made for a kth image quality adjustment, the value of noise reduction N is expressed as N (k), the value of edge enhancement E is expressed as E (k), and the value of coherency enhancement C is expressed as C (k). Then, a relationship between the button operation for the kth image quality adjustment and the button operation for a k−1th image quality adjustment may be expressed as follows.

$$N(k)=N(k-1)+\Delta N$$

$$E(k)=E(k-1)+\Delta E$$

$$C(k)=C(k-1)+\Delta C$$

Here, $\Delta N$ indicates the width of increase or decrease of the value of noise reduction N, $\Delta E$ indicates the width of increase or decrease of the value of the edge enhancement E, and ΔC indicates the width of increase or decrease of the value of coherency enhancement C.

After setting the new anchor Ak, the medical image diagnosis apparatus 100 returns to Step S10 described above and records the location of this new anchor Ak. Then, by using the new anchor Ak to execute Step S12 to the Step S20, it generates the thumbnail image of the new anchor Ak, displays as the first image quality adjustment button 301, generates the thumbnail image around the new anchor Ak, and displays as the image quality adjustment button for the user to change the image quality index value. For this reason, these regeneration display processing are executed by the regeneration display function 206e in the processing circuitry 206 of the medical image diagnosis apparatus 100 setting the new anchor Ak.

On the other hand, when determining at Step S22 that the user has not selected any image quality adjustment button (Step S22: No), the medical image diagnosis apparatus 100 determines whether the user has selected the setting termination button ED (Step S26). Specifically, the setting function 206f in the processing circuitry 206 of the medical image diagnosis apparatus 100 determines whether the user has pressed the setting termination button ED of the image quality adjustment setting screen W10 to select in the touch command screen 104.

When the user has not selected the setting termination button (Step S26: No), the medical image diagnosis apparatus 100 returns to Step S22 described above. That is to say, it standbys until the image quality adjustment button or the setting termination button ED on the image quality adjustment setting screen W10 is selected by the user.

On the other hand, when the user has selected the setting termination button ED (Step S26: Yes), the medical image diagnosis apparatus 100 generates the anchor flow line based on at least the starting point and the ending point in which the anchor starts and ends the movement, and sets the adjustable range of the image quality index value by the user based on this anchor flow line (Step S28). Specifically, the setting function 206f in the processing circuitry 206 of the medical image diagnosis apparatus 100 generates the anchor flow line and sets the adjustable range of the image quality index value.

According to the present embodiment, at Step S10, a coordinates of the anchor Ak from point $A_0$ to point $A_m$, which are the starting point and the ending point in which the anchor starts and ends the movement, is stored in the memory 205 which is the memory. For this reason, the setting function 206f in the processing circuitry 206 obtains, from the memory 205, the coordinates of the anchor Ak from point $A_0$ to point $A_m$, which are the starting point and the ending point in which the anchor starts and ends the movement, and generates the anchor flow line such as that shown in FIG. 10. Then, it sets the space 602 comprising each of the adjustable range 601 centered on each point from point $A_0$ to point $A_m$ as the adjustable range.

Otherwise, the setting function 206f in the processing circuitry 206 obtains the coordinates of the anchor from point $A_0$ to point $A_m$, which are the starting point and the ending point in which the anchor starts and ends the movement, from the memory 205, and generates the anchor flow line such as that shown in FIG. 11 based on point $A_0$ and point $A_m$, which are the starting point and the ending point in which the anchor starts and ends the movement. Then, it sets the two spaces of adjustable ranges 601, each centered around point $A_0$ and point $A_m$ which are the starting point and the ending point of the anchor flow line, and space 602, which connects these two spaces, as the adjustable range of the image quality index value.

By executing this step S28, the adjustable range setting process according to the present embodiment terminates. By this, a user selectable range of image quality index value thereafter is limited to the set adjustable range. That is to say, user selection is limited to the adjustable range of the image quality index value set at step S28 until a new the adjustable range setting process is executed and the adjustable range is reset.

Figure 13:
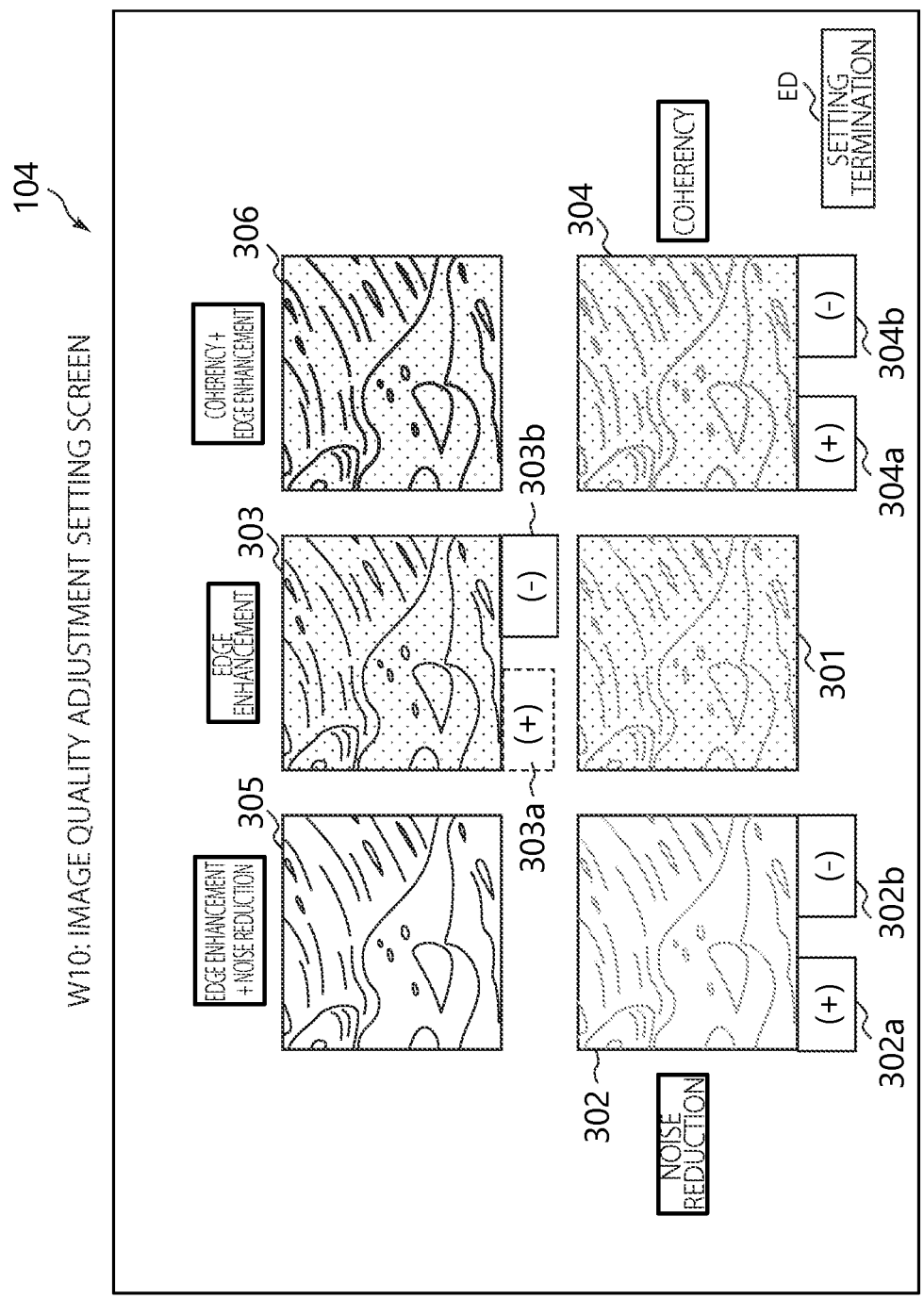
FIG. 13 is a diagram illustrating an example of the image quality adjustment setting screen displayed on the touch command screen when the set image quality index value exceeds the adjustable range.

For example, in the medical image diagnosis apparatus 100 according to the present embodiment, the image quality adjustment setting screen W10 as shown in FIG. 13 is displayed when exceeding the adjustable range of the set image quality index value. This FIG. 13 is a diagram showing an example of the image quality adjustment setting screen W10 displayed on the touch command screen 104 when exceeding the adjustable range of the set image quality index value, which is a diagram corresponding to FIG. 4 described above.

As shown in FIG. 13, on the image quality adjustment setting screen W10, that image quality index value may not be increased or decreased anymore when exceeding the adjustable range of the set image quality index value. In the example of FIG. 13, since the value of edge enhancement E becomes greater than the adjustable range if it is increased anymore, the user will be unable to select the plus switching button 303a. Alternatively, the plus switching button may not be displayed on the image quality adjustment setting screen W10. Note that, without being limited to these, various ways are conceivable in limiting a user's selection of the adjustable range of the set image quality index value, but any method which limits the user's selection is fine.

As above, in the medical image diagnosis apparatus 100 according to the present embodiment, by limiting the user selectable range among the multiple types of image quality index value, combinations of unrealistic, unnecessary image quality index values may be eliminated by executing the adjustable range setting process. For this reason, it becomes easier for the user to adjust the image quality based on personal preferences by setting the adjustable range once.

Note that, in the medical image diagnosis apparatus 100 according to the embodiment described above, and on the image quality adjustment setting screen W10 shown in FIGS. 4 through 6, three types of image quality index values were adjusted in a single screen, but four types of image quality index values may be adjusted in the single screen as well. In this case, there are nine buttons of image quality adjustment button on the image quality adjustment setting screen W10 instead of six. A specific example of this image quality adjustment setting screen W10 is shown in FIG. 14.

Figure 14:
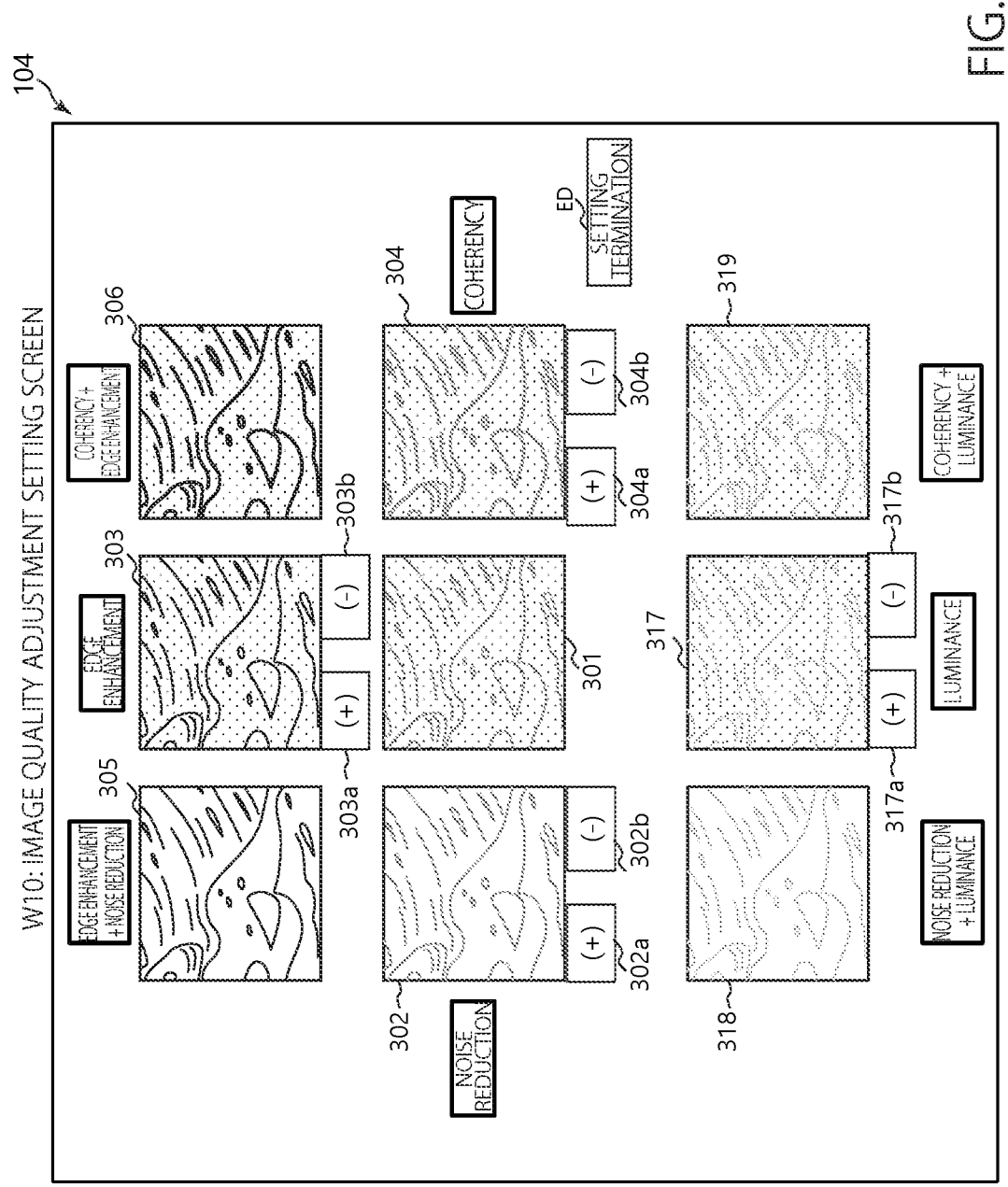
FIG. 14 is a diagram illustrating an example of the image quality adjustment setting screen which allows the user to select four types of image quality index value on a single screen.

FIG. 14 is a diagram illustrating an example of the image quality adjustment setting screen W10 allowing the user to adjust four types of image quality index values on the single screen. In this example of FIG. 14, in addition to the three values of the noise reduction, the edge enhancement, and the coherency enhancement, a value of luminance is made adjustable as the image quality index value on the single screen. That is to say, the seventh image quality adjustment button 317 to a ninth image quality adjustment button 319 to adjust the value of luminance are added on a bottom row of the image quality adjustment setting screen W10 shown in FIG. 4.

The seventh image quality adjustment button 317 arranged on the right of the first image quality adjustment button 301 is a button which the user selects to increase or decrease the image quality index value of the luminance without changing other image quality index values. Whether to increase or decrease the image quality index value of luminance is switched by the switching buttons 317a, 317b.

The eighth image quality adjustment button 318 is arranged below the second image quality adjustment button 302 and on the left of the seventh image quality adjustment button 317. This arrangement means to change both image quality index values of the noise reduction and the luminance. The ninth image quality adjustment button 319 is arranged on the right of the seventh image quality adjustment button 317 and below the fourth image quality adjustment button 304. This arrangement means to change both image quality index values of the coherency enhancement and the luminance.

By selecting the eighth image quality adjustment button 318, whether to increase or decrease the value of noise reduction is switched by the switching buttons 302a, 302b, and whether to increase or decrease the value of luminance is switched by the switching buttons 317a, 317b. That is to say, the increase and decrease of the image quality index value of the noise reduction and the luminance are switched by the combination of the switching buttons 302a, 302b and the switching buttons 317a, 317b.

Similarly, by selecting the ninth image quality adjustment button 319, whether to increase or decrease the value of coherency enhancement is switched by the switching buttons 304a, 304b, and whether to increase or decrease the value of luminance is switched by the switching buttons 317a, 317b. That is to say, the increase and decrease of the image quality index value of the coherency enhancement and the luminance are switched by the combination of the switching buttons 304a, 304b and the switching buttons 317a, 317b.

By configuring the image quality adjustment setting screen W10 as such, four types of image quality index values may be adjustable on the single screen. When there are more than five types of image quality index values, the user has to operate the touch command screen 104 and select which image quality index, among the multiple types of image quality indexes, to display and adjust on the single screen. For instance, when there are ten types of image quality indexes selectable by the user, it is necessary to have the user select four types among these.

In such case, arrangement of the image quality adjustment button within the image quality adjustment setting screen W10 corresponding to the user selected types of the image quality indexes may be arbitrarily assigned by the user. This is because the type of image quality index value corresponding to two diagonally adjacent image quality adjustment buttons among the four types of image quality index values may be simultaneously adjusted by selecting one image quality adjustment button, but the image quality index value corresponding to another one image quality adjustment button not adjacent and arranged on the other side cannot be combined and simultaneously adjusted.

For instance, in the example of FIG. 14, since the function adjusting the value of edge enhancement is assigned to the third image quality adjustment button 303, and the function of adjusting the value of noise enhancement and the function of adjusting the value of coherency enhancement are each assigned to the second image quality adjustment button 302 and the fourth image quality adjustment button 304, the value of edge enhancement and the value of noise reduction may be simultaneously adjusted by selecting the fifth image quality adjustment button 305, and the value of edge enhancement and the value of coherency enhancement may be simultaneously adjusted by selecting the sixth image quality adjustment button 306. However, the seventh image quality adjustment button 317 which adjusts the value of luminance is arranged on the other side of the third image quality adjustment button 303 which adjusts the value of edge enhancement and is not adjacent. For this reason, simultaneously adjusting the value of edge enhancement and the value of luminance with one image quality adjustment button is not possible with arrangement of the image quality adjustment buttons displayed on the image quality adjustment setting screen W10 shown in FIG. 14. For this reason, the user may be allowed to arbitrarily select the combination which adjusts the image quality index value with one image quality adjustment button simultaneously.

Note that, the image processing in the image processor 204 of the medical image diagnosis apparatus 100 described above, actually, often has a plurality of parameters. In such case, it is necessary to convert by computing the user selected image quality index values to parameters used in the image processor 204. By converting the image quality index values to the parameters, the user selected image quality index value may be indirectly used to adjust the image quality of the medical images.

For instance, in three types of the image quality indexes of the noise reduction N, the edge enhancement E, and the coherency enhancement C, when defining the image quality indexes as S={N, E, C} and defining the parameters as P={p1, p2, . . . , pn}, a conversion by computation may be expressed by a function P=F(s). If this function is linear, F is a matrix and P=F(s) may be represented as P=FS.

For this reason, in the adjustable range setting process of FIG. 12 described above, at Step S12, the first image generating function 206a of the processing circuitry 206, and at Step S18, the second image generating function 206c of the processing circuitry 206, may compute a plurality of parameters from the user selected image quality index value and control the image processor 204 based on these computed parameters to generate various thumbnail images. Otherwise, at Step S12, the first image generating function 206a of the processing circuitry 206, and at Step S18, the second image generating function 206c of the processing circuitry 206, may output the user selected image quality index value to the image processor 204, and the image processor 204 may compute the plurality of parameters from the image quality index value and generate various thumbnail images based on these computed parameters.

Second Embodiment

In the medical image diagnosis apparatus 100 according to the first embodiment described above, multiple examples of the image quality adjustment setting screen W10 displayed on the touch command screen 104 were described, but multiple variations which changes that interface exists. For example, in the medical image diagnosis apparatus 100 according to the first embodiment described above, a maximum of four types of image quality indexes were simultaneously adjustable using one image quality adjustment setting screen W10, but more than five types were not adjustable in the single screen. Likewise, in the medical image diagnosis apparatus 100 according to the first embodiment, the medical image was able to be confirmed as the thumbnail image when simultaneously changing two types of image quality indexes, but the thumbnail image where the image quality index value was changed to plus and the thumbnail image was changed to minus, was unable to be confirmed simultaneously. Therefore, in a second embodiment, on the single screen displayed on the touch command screen 104, the user may simultaneously confirm in the single screen the thumbnail image where the image quality index value is changed to plus and minus. Parts different from that of the first embodiment described above will be described below.

Figure 15:
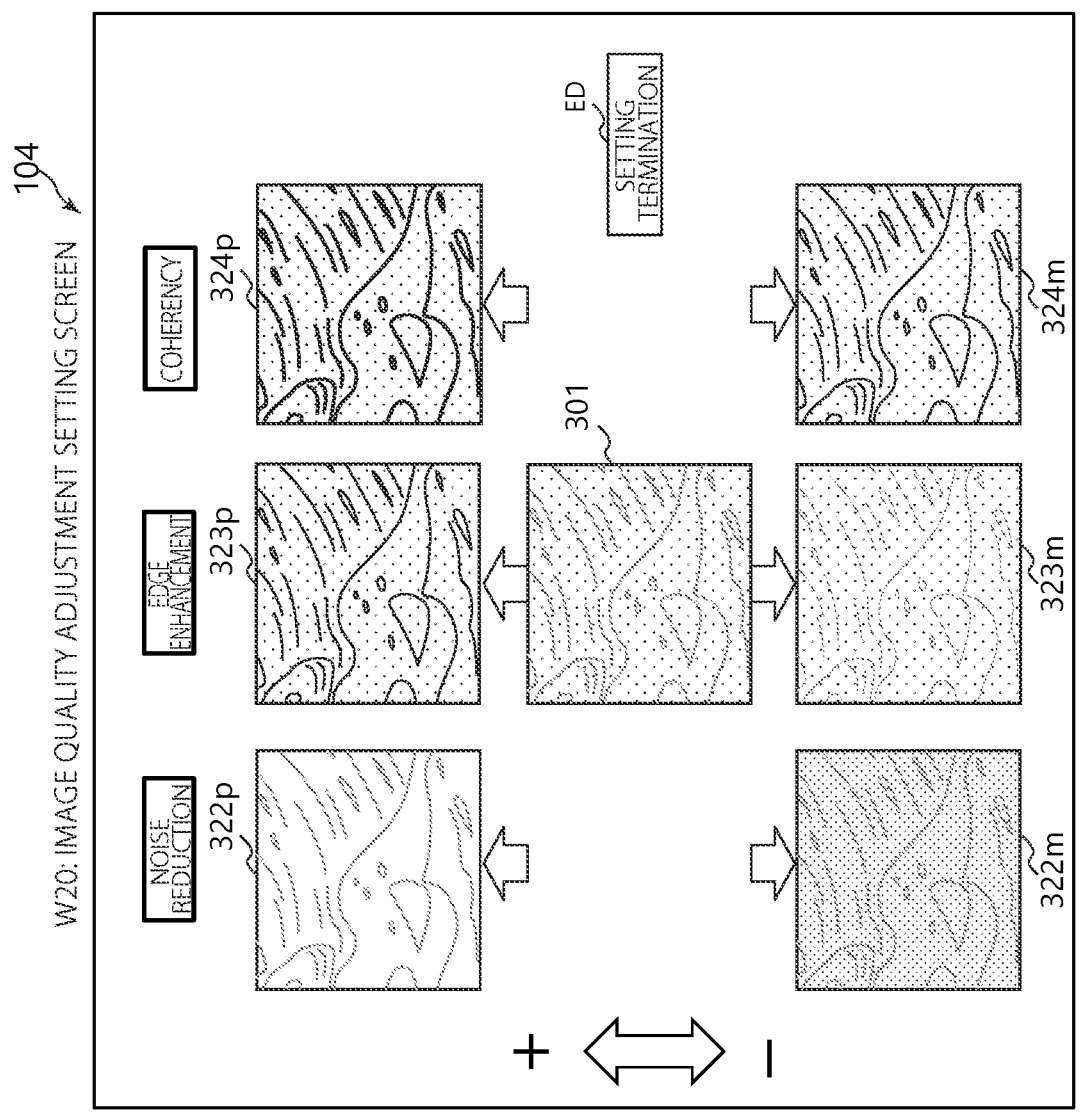
FIG. 15 is a diagram illustrating an example of the image quality adjustment setting screen displayed on the touch command screen of the medical image diagnosis apparatus according to the second embodiment.

FIG. 15 is a diagram illustrating an example of an image quality adjustment setting screen W20 displayed on the touch command screen 104 of the medical image diagnosis apparatus 100 according to a second embodiment. As shown in FIG. 15, on the image quality adjustment setting screen W20 according to the second embodiment, similar to that of the first embodiment described above, the user may also adjust three types of image quality index values: the noise reduction, the edge enhancement, and the coherency enhancement.

As shown in this FIG. 15, seven image quality adjustment buttons are displayed in the present embodiment. Similar to that of the first embodiment described above, the thumbnail image of the first image quality adjustment button 301 is displayed on the center part of the image quality adjustment setting screen W20, and the thumbnail image with image processing done based on the image quality index value same to that of the medical image displayed on the main display screen 103 at that time, is displayed. That is to say, the thumbnail image of this first image quality adjustment button 301 is an image generated by performing image processing the medical image based on the image quality index value determined by the anchor Ak at this time. Likewise, as described in the first embodiment, the image quality adjustment button 301 may not be assigned with any function or may be assigned with a function which returns the anchor to the previous image quality index value.

In the image quality adjustment setting screen W20, the user may increase or decrease each image quality index values of the noise reduction N, the edge enhancement E, and the coherency enhancement C from the anchor, which is the image quality index value displayed on the first image quality adjustment button 301, by preset values ΔN, ΔE, and ΔC respectively. In the example of FIG. 15, the image quality adjustment buttons around the first image quality adjustment button 301 are sets of two, which includes a pair of a second image quality adjustment button 322p which increases the image quality index value of the noise reduction N and a third image quality adjustment button 322m which decreases the image quality index value of the noise reduction N, a pair of a fourth image quality adjustment button 323p which increases the image quality index value of the edge enhancement E and a fifth image quality adjustment button 323m which decreases the image quality index value of the edge enhancement E, and a pair of a sixth image quality adjustment button 324p which increases the image quality index value of the coherency enhancement C and a seventh image quality adjustment button 324m which decreases the image quality index value of the coherency enhancement C.

The thumbnail images, based on the value increased or decreased by just one level from the image quality index value assigned to each of these second image quality adjustment button 322p to the seventh image quality adjustment button 324m, are displayed on these second image quality adjustment button 322p to the seventh image quality adjustment button 324m. For instance, the thumbnail image of the medical image based on a value increased by just one level from the noise reduction N is displayed on the second image quality adjustment button 322p. Likewise, the thumbnail image of the medical image based on a value decreased by just one level from the noise reduction N is displayed on the third image quality adjustment button 322m. For this reason, in the thumbnail images, the user may not confirm the effects where different plurality of image quality index values are simultaneously changed, but may simultaneously confirm both the thumbnail images on the same screen where the values of noise reduction are increased and decreased.

As such, in the present embodiment, the thumbnail image where a type of image quality index value is increased and decreased may be simultaneously confirmed in the same screen. Then, similar to that of the first embodiment described above, the user selects the setting termination button ED after terminating setting the image quality index value range in the adjustable range setting process.

Note that, in the present embodiment, the thumbnail image displayed on the first image quality adjustment button 301 corresponds to the first thumbnail image, and the thumbnail images displayed on the second image quality adjustment button 322p to the seventh image quality adjustment button 324m correspond to the second thumbnail image.

As described above, in the medical image diagnosis apparatus 100 according to the present embodiment, both thumbnail images where the type of image quality index values is increased or decreased may be seen on the single image quality adjustment setting screen W20. For this reason, the user may easily determine which type of image quality index value to increase or decrease.

Likewise, instead of limiting the types of image quality indexes adjustable on the single image quality adjustment setting screen W20 to three or four types, more types of image quality indexes may be adjustable. That is to say, as long as the display area of the touch command screen 104 allows, the image quality adjustment buttons may be arranged such that the user may adjust an arbitrary type of image quality indexes in the single screen.

Third Embodiment

In the medical image diagnosis apparatus 100 according to a third embodiment, by having two types of image quality indexes adjustable on the image quality adjustment setting screen displayed on the touch command screen 104, the user may confirm on the single screen the thumbnail images where these two types of image quality indexes are increased or decreased in an arbitrarily combination. The parts different from that of the first embodiment described above will be described below.

Figure 16:
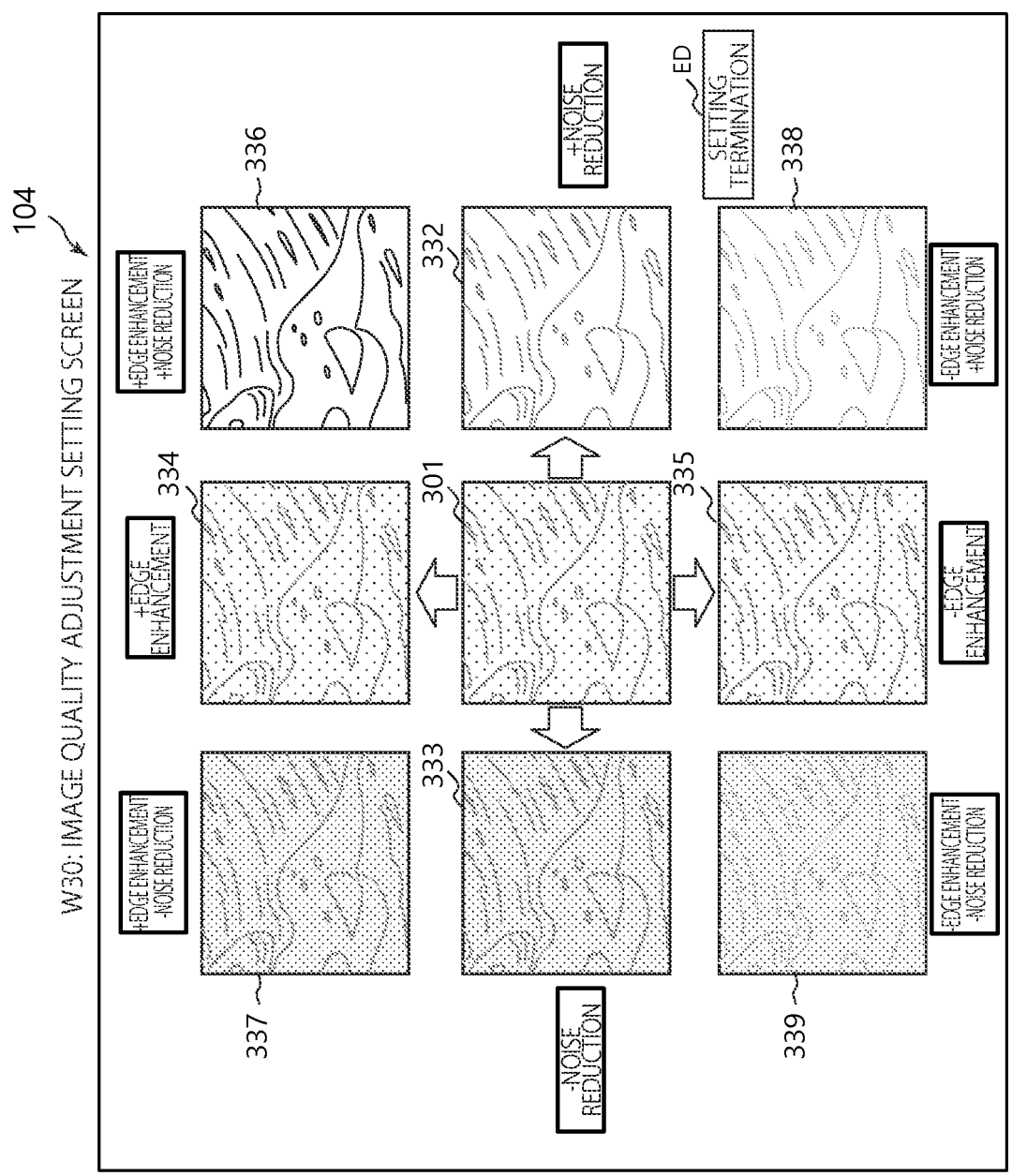
FIG. 16 is a diagram illustrating an example of the image quality adjustment setting screen displayed on the touch command screen of the medical image diagnosis apparatus according to a third embodiment.

FIG. 16 is a diagram illustrating an image quality adjustment setting screen W30 displayed on the touch command screen 104 of the medical image diagnosis apparatus 100 according to the third embodiment. As shown in FIG. 16, on the image quality adjustment setting screen W30 according to the third embodiment, the user may adjust two types of image quality index values: the noise reduction and the edge enhancement. For instance, the user, by operating the touch command screen 104, may select an arbitrary two types of image quality indexes among the plurality of image quality indexes on the image quality adjustment setting screen W30 as the selectable image quality indexes.

As shown in FIG. 16, nine image quality adjustment buttons are displayed in the present embodiment. Similar to that of the first embodiment described above, the thumbnail image of the first image quality adjustment button 301 is displayed on the center part of the image quality adjustment setting screen W30, and the thumbnail image with image processing done based on the image quality index value, same to that of the medical image displayed on the main display screen 103 at that time, is displayed. That is to say, the thumbnail image of this first image quality adjustment button 301 is an image generated by performing image processing the medical image based on the image quality index value determined by the anchor Ak at this time. Likewise, as described in the first embodiment, this image quality adjustment button 301 may not be assigned with any function or may be assigned with the function which returns the anchor to the previous the anchor.

On this image quality adjustment setting screen W30, the user may increase or decrease by just the preset value ΔN, ΔE, each image quality index values of the noise reduction N and the edge enhancement E from the anchor, which is the image quality index value displayed on the first image quality adjustment button 301. In this example of FIG. 16, a second image quality adjustment button 332 which increases the image quality index value of the noise reduction N, a third image quality adjustment button 333 which decreases the image quality index value of the noise reduction N, a fourth image quality adjustment button 334 which increases the image quality index value of the edge enhancement E, and a fifth image quality adjustment button 335 which decreases the image quality index value of the edge enhancement E are arranged as image quality adjustment buttons around the first image quality adjustment button 301. Furthermore, a sixth image quality adjustment button 336 which increases the image quality index values of the noise reduction N and the edge enhancement E, a seventh image quality adjustment button 337 which decreases the image quality index value of noise reduction N and increases the image quality index value of the edge enhancement E, an eighth image quality adjustment button 338 which increases the image quality index value of the noise reduction N and decreases the image quality index value of the edge enhancement E, and a ninth image quality adjustment button 339 which decreases the image quality index values of the noise reduction N and the edge enhancement E are arranged in the corner locations of arrangement of the nine image quality adjustment buttons.

The thumbnail images with image processing done based on the image quality index values assigned to each of these second image quality adjustment button 332 to the ninth image quality adjustment button 339 are displayed in these image quality adjustment buttons. For this reason, the user may confirm on the single image quality adjustment setting screen W30 each thumbnail image where the value of noise reduction N is increased or decreased, each thumbnail image where the value of edge enhancement E is increased or decreased, and the thumbnail image where these are combined. Then, the anchor may be moved by selecting the image quality adjustment button of the thumbnail image personally determined as most suitable.

As described above, in the medical image diagnosis apparatus 100 according to the present embodiment, the image quality indexes adjustable on the single screen is limited to two types, but both thumbnail images where these two types of image quality index values are increased and decreased may be simultaneously confirmed. Furthermore, the thumbnail image where these two types of image quality index values are simultaneously changed may also be confirmed in the single screen. For this reason, the user may appropriately determine how to combine the increase or decrease of two types of image quality index values to obtain the medical image with a personally preferable image quality.

Fourth Embodiment

In the first to the third embodiments described above, configuration or the operation of the medical image diagnosis apparatus 100 was described with a premise that a single user sets the adjustable range of a single image quality index. However, in reality, even if there is one user, if the subject or the target site imaging the medical image differs, the image quality index value optimal to the user may differ. Likewise, even if the imaging target site of the medical image is equal, the image quality index value optimal to the user will fluctuate when multiple users set the image quality.

There, in the medical image diagnosis apparatus 100 according to a fourth embodiment, where the plurality of trajectories of the anchors are stored in the memory 205, the trajectory of another anchor, i.e., the trajectory of an unknown anchor may be estimated based on the plurality of trajectories of the anchors. Then, another anchor flow line is generated based on this estimated trajectory of the anchor, the adjustable range of the image quality index is estimated based on this another the anchor flow line, and the adjustable range of the estimated image quality index is set to the medical image diagnosis apparatus 100 by the user. Note that, the description below may be commonly applied to any medical image diagnosis apparatus 100 of the first to the third embodiments described above.

The trajectory of movement of the anchor Ak in N-dimensional space may be treated as a time-series data for each dimension. That is to say, in the adjustable range setting process, the adjustable range is expressed in 2-dimentional space if there are two types of image quality indexes for which the adjustable range is set, or expressed in 3-dimentional space if there are three types. In such N-dimensional space, the trajectory of the anchor Ak when the anchor Ak moves from point $A_0$ to point $A_m$ may be treated as the time-series data. When such time series data is stored as the plurality of trajectories of the anchors, a simplest method to estimate the time-series data is prediction by linear regression.

That is to say, since the plurality of trajectories of the anchors is each expressed as the trajectory of coordinates of the anchor Ak when the anchor Ak moves from point $A_0$ to point $A_m$, by using a least squares method and estimating the coordinate of another point from the plurality of trajectories of the anchors, the time-series data of this estimated point becomes the trajectory of the anchor. By generating the anchor flow line based on the trajectory of the anchor estimated with such method and setting the adjustable range of the image quality index values based on this anchor flow line, adjustment of image quality index values may be limited to a typical range optimized for many users.

On the other hand, machine learning may be used as the method to estimate the trajectory of another anchor based on the plurality of trajectories of the anchors. For instance, the trajectory of another anchor Ak may be estimated by applying Recurrent Neural Network (RNN) or Long Short-Term Memory (LSTM) network to each time-series data.

Figure 17:
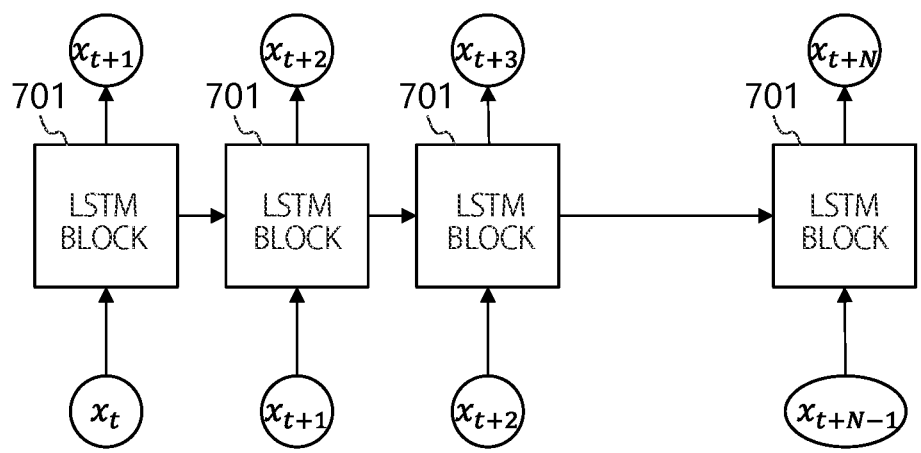
FIG. 17 is a block diagram illustrating a configuration of an LSTM network when a trajectory of another anchor is estimated based on the trajectory of a plurality of the anchors.

FIG. 17 is a block diagram illustrating a configuration of an LSTM network when the trajectory of another anchor is estimated based on the plurality of trajectories of the anchors. As shown in FIG. 17, N items of LSTM blocks 701 are connected for a pair of a data series $x\_t$, $x\_(t+1)$, $x\_(t+2)$, . . . , $x\_(t+N-1)$ of a step t and the data series $x\_(t+1)$, $x\_(t+2)$, $x\_(t+3)$, . . . , $y\_(t+N)$ of one step thereafter.

The LSTM blocks 701 each have a single memory cell and are controlled by three gates: an input, output, and forget. With such configuration, the plurality of trajectories of the anchors stored in the memory 205 are trained as the trajectory of the anchors known in advance, and the trajectory of the unknown anchor is estimated. For this reason, in the present embodiment, it is necessary to store the plurality of trajectories of the anchors Ak stored in the memory 205 in the adjustable range setting process at Step 10 shown in FIG. 12.

Likewise, by combining the LSTM network with a Convolutional Neural Network (CNN), including a specific quantity of data attributes such as a probe type or the medical image such as the imaging target site to a portion of input data to be trained, an estimate considering the data attributes or medical image features also become possible.

Figure 18:
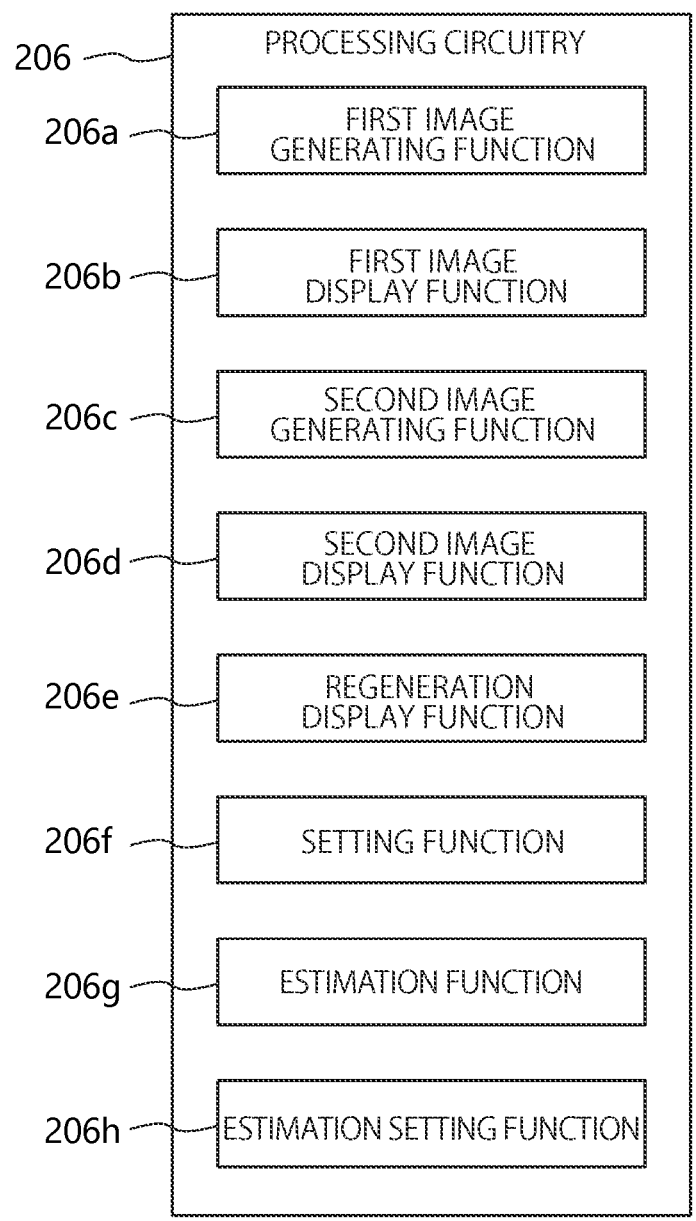
FIG. 18 is a functional block diagram describing a function of the processing circuitry of the medical image diagnosis apparatus according to a fourth embodiment.

FIG. 18 is a functional block diagram describing a function of the processing circuitry 206 of the medical image diagnosis apparatus 100 according to the present embodiment, which corresponds to FIG. 3 described above. As shown in this FIG. 18, the processing circuitry 206 of the medical image diagnosis apparatus 100 according to the present embodiment comprises an estimation function 206g and an estimation setting function 206h, in addition to the processing circuitry 206 of the first to the third embodiment described above.

Also, in the present embodiment, each processing function executed in the estimation function 206g and the estimation setting function 206h is stored in the memory 205 in the form of computer executable program. The processing circuitry 206 realizes these functions by executing the program read from the memory 205.

The estimation function 206g in the processing circuitry 206 obtains by reading the plurality of trajectories of the anchors stored in the memory 205 and estimates the trajectory of another anchor based on the plurality of trajectories of the anchors with the techniques as described above. For example, the estimation function 206g in the processing circuitry 206 realizes the LSTM network shown in FIG. 17 through software.

The estimation setting function 206h in the processing circuitry 206 generates another anchor flow line based on the trajectory of another anchor estimated by the estimation function 206g and sets the adjustable range of the image quality index value by the user based on this another anchor flow line. When the adjustable range is set as such, the selection of the user is limited to the adjustable range of the set image quality index value based on an estimation until the adjustable range is reset.

As above, in the medical image diagnosis apparatus 100 according to the present embodiment, it is possible to easily derive the trajectory of the anchor which multiple users believe as optimal, since another anchor was estimated based on the plurality of trajectories of the anchors. By generating the anchor flow line based on a derived trajectory of the anchor and setting the adjustable range of the image quality index value, a setting of the adjustable range preferable to anyone may be realized. For this reason, for instance, even a user who performs the setting of the adjustable range regarding the medical image of a site for a first time may easily perform the setting of the adjustable range close to a personal optimum.

Fifth Embodiment

The medical image diagnosis apparatus 100 according to the first to the fourth embodiments described above was described with an example where it was configured by the ultrasonic diagnosis apparatus, but the process setting the adjustable range of the image quality index value described above may be applied to various medical image diagnosis apparatus, without being limited to the ultrasonic diagnosis apparatus. Therefore, an example where the medical image diagnosis apparatus 100 is applied to the Magnetic Resonance Imaging (MRI) apparatus will be described in a fifth embodiment.

Figure 19:
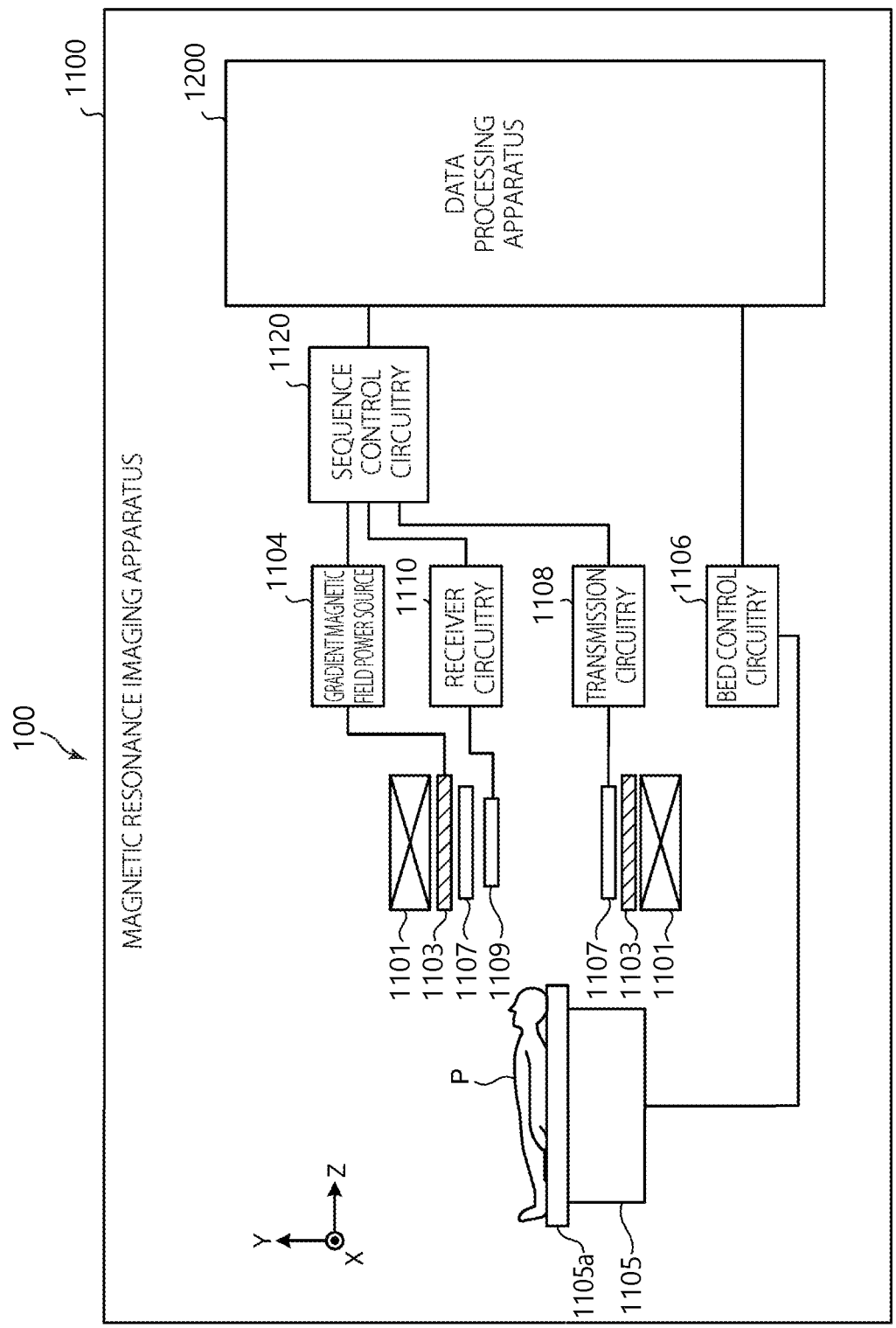
FIG. 19 is a diagram schematically describing a functional configuration of the medical image diagnosis apparatus according to a fifth embodiment.

FIG. 19 is a diagram schematically describing a configuration of the medical image diagnosis apparatus 100 according to the fifth embodiment. As shown in FIG. 19, in the present embodiment, the medical image diagnosis apparatus 100 is configured by the MRI apparatus 1100. The medical image diagnosis apparatus 100 configured by the MRI apparatus 1100, for instance, is configured comprising a static magnetic field magnet 1101, a static magnetic field power source (not shown), a gradient magnetic field coil 1103, a gradient magnetic field power source 1104, a bed 1105, a bed control circuitry 1106, a transmission coil 1107, a transmission circuitry 1108, a receiver coil 1109, a receiver circuitry 1110, a sequence control circuitry 1120, and a data processing apparatus 1200. Note that the subject P (a human, for example) is shown for ease of understanding but is not included in the configuration of the MRI apparatus 1100.

The static magnetic field magnet 1101 is a magnet formed in a substantially cylindrical hollow shape and generates a static magnetic field in an inner space. The static magnetic field magnet 1101, for example, is a superconductive magnet etc., which excites receiving a current supply from the static magnetic field power source. The static magnetic field power source supplies current to the static magnetic field magnet. In another example, the static magnetic field magnet 1101 may be a permanent magnet, in which case the MRI apparatus 1100 may not comprise the static magnetic field power source. Likewise, the static magnetic field power source may be comprised aside from the MRI apparatus 1100.

The gradient magnetic field coil 1103 is a coil formed in a substantially cylindrical hollow shape which is arranged on an interior of the static magnetic field magnet 1101. The gradient magnetic field coil 1103 is formed by combining three coils corresponding to each of the X, Y, and Z-axis orthogonal to each other, and these three coils each receive the current supply from the gradient magnetic field power source 1104 and generate a gradient magnetic field which a magnetic field strength changes along each of the X, Y, and Z-axis. The gradient magnetic field of each of the X, Y, and Z-axis generated by the gradient magnetic field coil 1103, for example, is a slice phase encoding gradient magnetic field Gs, a gradient magnetic field Ge, and a readout gradient magnetic field Gr. The gradient magnetic field power source 1104 supplies current to the gradient magnetic field coil 1103.

The bed 1105 comprises a top board 1105a on which the subject P is placed, and under the control of the bed control circuitry 1106, inserts the top board 1105 into a hollow space (imaging opening) of the gradient magnetic field coil 1103 in a state in which the subject is placed. Generally, the bed 1105 is installed in such a way that the longitudinal direction thereof parallel to a central axis of the static magnetic field magnet 1101. The bed control circuitry 1106 moves the top board 1105a in the longitudinal direction and a vertical direction by driving the bed 1105 under the control of the data processing apparatus 1200.

The transmission coil 1107 is arranged on the interior of the gradient magnetic field coil 1103 and generates a high-frequency magnetic field by receiving an RF pulse supply from the transmission circuitry 1108. The transmission circuitry 1108 supplies the RF pulse corresponding to a Larmor frequency determined by a type of target atom and the magnetic field strength.

The receiver coil 1109 is arranged on the interior of the gradient magnetic field coil 1103 and receives a magnetic resonance signal emitted from the subject P by an effect of the high-frequency magnetic field. The receiver coil 1109 outputs the received magnetic resonance signal to the receiver circuitry 1110 when it receives the magnetic resonance signal.

Note that the transmission coil 1107 and the receiver coil 1109 are only examples. Configuration combining one or more among a coil with only a transmission function, a coil with only a receiver function, or a coil with transmission and receiver functions is fine.

The receiver circuitry 1100 detects the magnetic resonance signal output from the receiver coil 1109 and generates the magnetic resonance data based on a detected magnetic resonance signal. Specifically, the receiver circuitry 1110 generates the magnetic resonance data by digital converting the magnetic resonance signal output from the receiver coil 1109. Likewise, the receiver circuitry 1100 transmits the generated magnetic resonance data to the sequence control circuitry 1120. Note that the receiver circuitry 1110 may be provided on a frame apparatus side which comprises the static magnetic field magnet 1101 or the gradient magnetic field coil 1103 etc.

The sequence control circuitry 1120 performs imaging the subject P by driving the gradient magnetic field power source 1104, the transmission circuitry 1108, and the receiver circuitry 1110, based on a sequence information transmitted from the data processing apparatus 1200. Here, the sequence information is information which defines a process to perform imaging. In the sequence information, a strength of current which the gradient magnetic field power source 1104 provides to the gradient magnetic field coil 1103 or a timing of supplying the current, a strength of RF pulse which the transmission circuitry 1108 provides to the transmission coil 1107 or a timing of applying the RF pulse, or a timing of the receiver circuitry 1110 detecting the magnetic resonance signal, etc., are defined.

Furthermore, the sequence control circuitry 1120, when it receives the magnetic resonance data from the receiver circuitry 1110, transmits the received magnetic resonance data to the data processing apparatus as a result of imaging the subject P by driving the gradient magnetic field power source 1104, the transmission circuitry 1108, and the receiver circuitry 1110.

Figure 20:
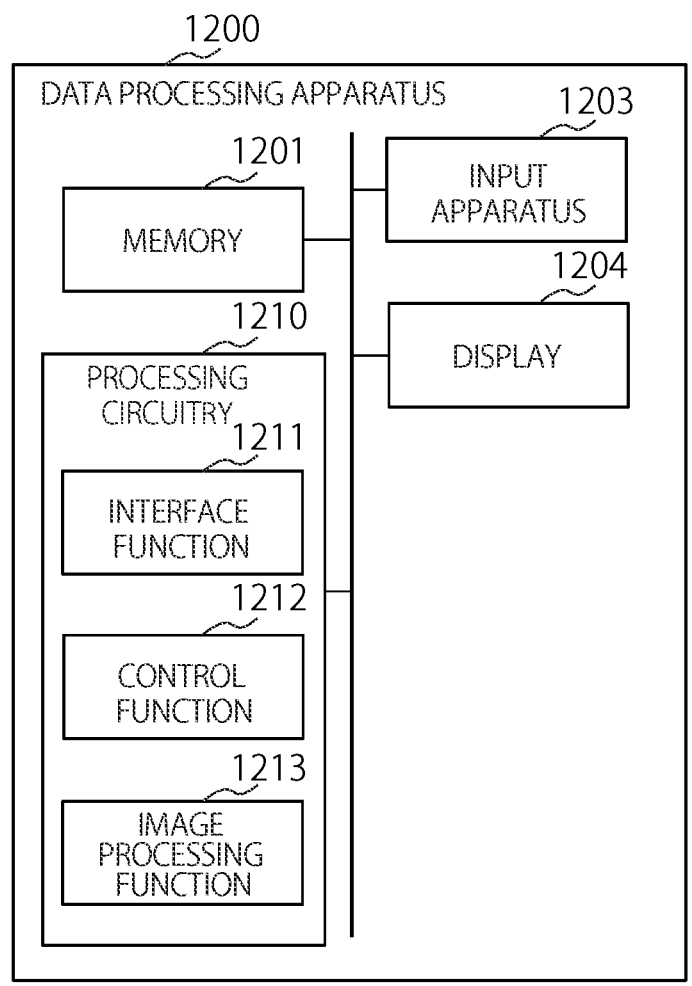
FIG. 20 is a functional block diagram describing a function of the processing circuitry of the medical image diagnosis apparatus shown in FIG. 19.

The data processing apparatus 1200 is connected to the MRI apparatus and executes processing the signal received from the MRI apparatus. The data processing apparatus 1200, as shown in FIG. 20, comprises a processing circuitry 1210, a memory 1201, an input apparatus 1203, and a display 1204. The processing circuitry 1210 comprises an interface function 1211, a control function 1212, and an image processing function 1213.

In the present embodiment, each processing function executed in the interface function 1211, the control function 1212, and the image processing function 1213 are stored in the memory 1201 in the form of computer executable program. The processing circuitry 1210 is a processor which realizes functions corresponding to each program by reading and executing programs from the memory 1201. In other words, the processing circuitry 1210 in a state which has read each program will have each function shown in the processing circuitry 1210.

The processing circuitry 1210 transmits the sequence information to the sequence control circuitry 1120 by the interface function 1211 and receives the magnetic resonance data from the sequence control circuitry 1120. Likewise, when it receives the magnetic resonance data, the processing circuitry 1210 which has the interface function 1211 stores the received magnetic resonance data in the memory 1201.

The magnetic resonance data stored in the memory 1201 is arranged in a k-space by the control function 1212. As a result, the memory 1201 stores a k-space data.

The memory 1201 stores the magnetic resonance data received by the processing circuitry 1210 which has the interface function 1211, the k-space data arranged in the k-space by the processing circuitry 1210 which has the control function 1212, and image data generated by the processing circuitry 1210 which has the image processing function 1213, etc.

The processing circuitry 1210 performs an overall control of the MRI apparatus 1100 by the control function 1212 to control an imaging, an image generation, or an image display etc. For instance, the processing circuitry 1210 which has the control function 1212 receives the input of an imaging condition (imaging parameters etc.) on the GUI and generates the sequence information according to the received imaging condition. Likewise, the processing circuitry 1210 which has the control function 1212 transmits the generated sequence information to the sequence control circuitry 1120.

The processing circuitry 1210 reads the k-space data from the memory 1201 by the image processing function 1213 and generates the magnetic resonance image by applying a reconstruction processing, such as a Fourier transform, to the read k-space data. Likewise, the image processing function 1213 also performs the enhancement image processing according to the first embodiment.

The processing circuitry 1210 obtains data or image etc. for image processing with the image processing function 1213, by the interface function 1211 from the memory 1201.

The input apparatus 1203 receives various commands or information input from an operator. The input apparatus 1203, for example, is a pointing device such the mouse or the trackball, a selecting device such as a mode selector switch, or the input device such as the keyboard. The input apparatus 1203 also comprises the touch command screen formed by the display 1204 which will be described later.

The display 1204, under the control of the control function 1212 etc., displays the GUI to receive the input of imaging conditions or the images generated by the control function 1212. The display 1204, for example, is a display device such as a liquid crystal display. The display 1204 is one example of the display. The display 1204 may comprise the mouse, the keyboard, the button, a panel switch, the touch command screen, a foot switch, the trackball, or the joystick, etc.

Also, in the MRI apparatus 1100 as above, similar to that of the ultrasonic diagnosis apparatus described in the first to the fourth embodiments, not only the image quality of the medical image may be adjusted by executing the adjustable range setting process shown in FIG. 12 and changing the image quality index value, but also the adjustable range of the multiple types of image quality index values may be limited based on the anchor flow line by the user operation of the image quality adjustment button.

In that case, the medical image of the target to adjust the image quality index value is the magnetic resonance image for which reconstruction processing is applied from the k-space data. For instance, the image quality index of the magnetic resonance image has the noise reduction, the edge enhancement, and the coherency enhancement like the ultrasonic diagnosis apparatus. The image quality adjustment setting screens W10, W20, W30 as shown in the first to the fourth embodiments described above are formed on the touch command screen on the display 1204 as the GUI to adjust the image quality index value by the image processing function 1213.

The operation or a display format of the image quality adjustment setting screens W10, W20, W30, except for that the thumbnail images displayed on each image quality adjustment button are generated based on the magnetic resonance images, are alike to that of the first to the fourth embodiments described above. That is to say, the adjustable range setting process shown in FIG. 12 is executed in the processing circuitry 1210, and the adjustable range of the image quality index value by the user is set based on the anchor flow line by the user. When the adjustable range setting process is executed, the image processing function 1213 fulfills the first image generating function 206a, the first image display function 206b, the second image generating function 206c, the second image display function 206d, and the regeneration display function 206e, and the control function 1212 fulfills the setting function 206f described above. Likewise, the control function 1212 fulfills the estimation function 206g and the estimation setting function 206h described above.

Then, based on the set adjustable range, the process of limiting the adjustable range of the multiple types of image quality index value by the user is alike to that of the first to the fourth embodiments described above. For this reason, for instance, the user is unable to select the image quality index value exceeding the adjustable range as described in FIG. 13.

As described above, regarding the medical image diagnosis apparatus 100 according to the present embodiment, the medical image diagnosis apparatus 100 may be configured by the MRI apparatus 1100. As such, it is possible to adjust the image quality index value of medical images imaged by the ultrasonic diagnosis apparatus, the MRI apparatus, an X-ray CT apparatus, a PET apparatus, and various medical imaging apparatuses, and set the adjustable range of the image quality index value based on that anchor flow line. As a result, the adjustable range for which the value may be selected regarding the multiple types of image quality indexes may be narrowed down thereafter, and unrealistic, unnecessary combinations of image quality index values may be eliminated. For this reason, it becomes easier for the user to adjust image quality based on personal preferences by setting the adjustable range of the image quality index value once.

Note that, in the medical image diagnosis apparatus 100 according to the first to the fifth embodiments described above, the adjustable range of the set image quality index value may not necessarily match with the range of values which may be changed by one operation on the image quality adjustment setting screens W10, W20, W30, when the user sets the adjustable range of the image quality index value. That is to say, in the embodiments described above, the width of increase or decrease of the image quality index value which may be changed by one operation of the image quality adjustment button displayed on the image quality adjustment setting screens W10, W20, W30 and the width of the set adjustable range have matched, but these two may as well as not match. For instance, the adjustable range of the set image quality index value may be expanded to a changed range of the image quality index value which may be done operating the image quality adjustment button of the image quality adjustment setting screens W10, W20, W30 multiple times. That is to say, a range which the image quality index value is increased or decreased by several levels from the anchor Ak may be the adjustable range of the image quality index value. By this, the range of the user selectable image quality index value is expanded and a user option of the image quality index value may increase.

Note that the word "processor" used in above descriptions means circuits such as, for example, a Central Processing Unit (CPU), a Graphics Processing Unit (GPU), an Application Specific Integrated Circuit (ASIC), a programmable logic device (for example, a Simple Programmable Logic Apparatus (SPLD), a Complex Programmable Logic Apparatus (CPLD), and a Field Programmable Gate Array (FPGA)). The processor executes functions by reading and executing programs stored in the memory. Note that programs may be configured to be directly incorporated in the processor instead of being storing in the memory. In this case, the processor realizes functions by reading and executing programs stored in the circuit. Note that the processor is not limited to the case configured as a single processor circuit, but may be configured as a single processor by combining a plurality of independent circuits to realize functions. Likewise, a plurality of components may be integrated into a single processor to realize functions.

While certain embodiments have been described, these embodiments have been presented by way of example only and are not intended to limit the scope of the inventions. Indeed, the novel apparatus and methods described herein may be embodied in a variety of other forms; Likewise, various omissions, substitutions, and changes in the form of the embodiments described herein may be made without departing from the spirit of the inventions. The accompanying claims and their equivalents are intended to cover such forms or modifications as would fall within the scope and spirit of the inventions.

For the embodiments described above, following notes are disclosed as one aspect and alternative features of the invention.

(Note 1)
A medical image diagnosis apparatus, comprising:
processing circuitry configured to
set a value of an image quality index selected by a user regarding multiple types of the image quality index to display medical image as an anchor, and generate the thumbnail of the medical image based on the anchor as a first thumbnail image;
cause a display to display the generated first thumbnail image;
generate a plurality of thumbnails as second thumbnail images by increasing or decreasing the image quality index by a preset value from the anchor regarding a medical image;
cause the display to display the generated plurality of second thumbnail images;
using the value of the image quality index corresponding to the second thumbnail image selected by the user among the plurality of the second thumbnail images as a new anchor, generate a new first thumbnail image, display the new first thumbnail image, generate a new second thumbnail image, and display the new second thumbnail image; and
when the user terminates selecting the value of the image quality index, generate an anchor flow line based on at least a starting point in which the anchor starts a movement and an ending point in which the anchor ends the movement, and set an adjustable range of the value of the image quality index adjustable by the user based on the anchor flow line.

(Note 2)

The processing circuitry may assign a function of an image selection button corresponding to the value of the image quality index of a relevant second thumbnail image to the plurality of second thumbnail images, and cause the display to display the plurality of second thumbnail images on the display.

(Note 3)

The processing circuitry may generate the anchor flow line based on a trajectory of the anchor, selected by the user, comprising the starting point and the ending point.

(Note 4)

The set adjustable range may be within a preset range from a point of the anchor comprising the trajectory of the anchor and a line connecting the point of the anchor.

(Note 5)

The processing circuitry may generate the anchor flow line based on a straight line connecting the starting point and the ending point.

(Note 6)

The set adjustable range may be within a preset range from a straight line connecting the starting point and the ending point.

(Note 7)

The processing circuitry may process the medical image, obtained in a preset framerate, in real-time based on the value of the image quality index of a current the anchor selected by the user.

(Note 8)

The processing circuitry may compute a plurality of parameters from the value of the image quality index, and respectively generate the first thumbnail image and the second thumbnail image based on computed parameters.

(Note 9)

The medical image diagnosis apparatus may comprise a memory configured store a plurality of trajectories of the anchors selected by the user and/or the processing circuitry may estimate the trajectory of another anchor based on the plurality of trajectories of the anchors stored in the memory.

(Note 10)

The processing circuitry may generate a different anchor flow line based on the trajectory of the estimated different anchor and set the adjustable range of the value of the image quality index based on the different anchor flow line.

(Note 11)

The medical image may be an image captured by an ultrasonic diagnosis apparatus.

(Note 12)

The medical image may be an image captured by a magnetic resonance imaging apparatus.

(Note 13)

The processing circuitry may cause the display to display the plurality of second thumbnail images around the first thumbnail image.

(Note 14)

The processing circuitry may control the value of the image quality index selectable by the user as an anchor, based on the adjustable range of the value of the image quality index.

(Note 15)

The processing circuitry, when the first thumbnail image is selected by the user, may use the previous anchor as the new anchor, generate the new first thumbnail image, display the first thumbnail image, generate the new second thumbnail image and display the new second thumbnail image.

(Note 16)

The processing circuitry may assign a function of an image selection button corresponding to the value of two image quality indexes to one or more second thumbnail images of the plurality of second thumbnail images.

(Note 17)

The processing circuitry may assign a function which returns the anchor to the previous image quality index value to the first thumbnail image.

The invention claimed is:

1. A medical image diagnosis apparatus, comprising:
processing circuitry configured to
set, as an anchor, a value of an image quality index selected by a user among multiple types of the image quality index used to display a medical image, and generate the thumbnail of the medical image based on the anchor as a first thumbnail image;
cause a display to display the generated first thumbnail image;
generate a plurality of thumbnails as second thumbnail images by increasing or decreasing the image quality index by a preset value from the anchor;
cause the display to display the generated plurality of second thumbnail images;
using, as a new anchor, the value of the image quality index corresponding to a second thumbnail image selected by the user among the plurality of the second thumbnail images, generate a new first thumbnail image, display the new first thumbnail image, generate a new second thumbnail image, and display the new second thumbnail image; and
when an input terminating selection of the value of the image quality index is received, generate an anchor flow line based on at least a starting point in which the anchor value begins to change and an ending point in which the anchor value ends the change, and set an adjustable range of the value of the image quality index adjustable by the user based on the anchor flow line.

2. The medical image diagnosis apparatus of claim 1, wherein the processing circuitry is further configured to assign a function of an image selection button corresponding to the value of the image quality index of each of the plurality of second thumbnail images to each of the plurality of second thumbnail images, and cause the display to display the plurality of second thumbnail images.

3. The medical image diagnosis apparatus of claim 1, wherein the processing circuitry is further configured to generate the anchor flow line based on a trajectory of changes in the anchor value, the trajectory including a starting point of the anchor value and an ending point of the anchor value selected by the user.

4. The medical image diagnosis apparatus of claim 3, wherein the set adjustable range is within a preset range from a point of the anchor value along the trajectory of changes in the anchor value and a line connecting the point of the anchor value.

5. The medical image diagnosis apparatus of claim 1, wherein the processing circuitry is further configured to generate the anchor flow line based on a straight line connecting the starting point and the ending point.

6. The medical image diagnosis apparatus of claim 5, wherein the set adjustable range is within a preset range from a straight line connecting the starting point and the ending point.

7. The medical image diagnosis apparatus of claim 1, wherein the processing circuitry is further configured to process the medical image, obtained in a preset framerate, in real-time based on the value of the image quality index of a current anchor selected by the user.

8. The medical image diagnosis apparatus of claim 1, wherein the processing circuitry is further configured to compute a plurality of parameters from the value of the image quality index, and respectively generate the first thumbnail image and the second thumbnail image based on computed parameters.

9. The medical image diagnosis apparatus of claim 3, further comprising a memory configured store a plurality of trajectories of changes in the anchor values selected by the user; and wherein the processing circuitry is further configured to estimate a trajectory of another anchor value based on the plurality of trajectories of the anchor values stored in the memory.

10. The medical image diagnosis apparatus of claim 9, wherein the processing circuitry is further configured to generate another anchor flow line based on the estimated trajectory of changes in the another anchor, and set the adjustable range of the value of the image quality index based on the another anchor flow line.

11. The medical image diagnosis apparatus of claim 1, wherein the medical image is an image captured by an ultrasonic diagnosis apparatus.

12. The medical image diagnosis apparatus of claim 1, wherein the medical image is an image captured by a magnetic resonance imaging apparatus.

13. The medical image diagnosis apparatus of claim 1, wherein the processing circuitry is further configured to cause the display to display the plurality of second thumbnail images around the first thumbnail image.

14. The medical image diagnosis apparatus of claim 1, wherein the processing circuitry is further configured to control the value of the image quality index selectable by the user as an anchor, based on the adjustable range of the value of the image quality index.

15. The medical image diagnosis apparatus of claim 1, wherein the processing circuitry, when the first thumbnail image is selected by the user, is further configured to use a previous anchor as the new anchor, generate the new first thumbnail image, display the first thumbnail image, generate the new second thumbnail image and display the new second thumbnail image.

\* \* \* \* \*